United States Patent
Roether et al.

(10) Patent No.: US 11,661,044 B2
(45) Date of Patent: May 30, 2023

(54) ELECTRICAL EQUIPMENT OF A VEHICLE HAVING REDUNDANT ABS AND DRIVING DYNAMICS CONTROL

(71) Applicant: KNORR-BREMSE SYSTEME FUER NUTZFAHRZEUGE GMBH, Munich (DE)

(72) Inventors: Friedbert Roether, Cleebronn (DE); Falk Hecker, Markgroeningen (DE); Adnan Mustapha, Maulbronn (DE); Frank Schwab, Kieselbronn (DE); Juergen Steinberger, Groebenzell (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 484 days.

(21) Appl. No.: 16/772,141

(22) PCT Filed: Dec. 13, 2018

(86) PCT No.: PCT/EP2018/084735
§ 371 (c)(1),
(2) Date: Jun. 11, 2020

(87) PCT Pub. No.: WO2019/115683
PCT Pub. Date: Jun. 20, 2019

(65) Prior Publication Data
US 2021/0070265 A1    Mar. 11, 2021

(30) Foreign Application Priority Data
Dec. 15, 2017  (DE) ...................... 10 2017 011 611.3

(51) Int. Cl.
*B60T 8/1755*    (2006.01)
*B60T 7/12*    (2006.01)
(Continued)

(52) U.S. Cl.
CPC .............. *B60T 8/1755* (2013.01); *B60T 7/12* (2013.01); *B60T 8/171* (2013.01); *B60T 13/683* (2013.01);
(Continued)

(58) Field of Classification Search
None
See application file for complete search history.

(56) References Cited

U.S. PATENT DOCUMENTS 10,399,550 B2 *  9/2019  Hecker ................ B60T 13/261
2007/0170774 A1  7/2007  Gerum et al.
(Continued)

FOREIGN PATENT DOCUMENTS

CN     107000726 A     8/2017
DE     102014107399 A1   11/2015
(Continued)

OTHER PUBLICATIONS

International Search Report dated Apr. 26, 2019 of the corresponding International Application PCT/EP2018/084735.

*Primary Examiner* — Peter D Nolan
*Assistant Examiner* — Michael F Whalen
(74) *Attorney, Agent, or Firm* — Norton Rose Fulbright US LLP; Gerard Messina; Aaron Deditch

(57) ABSTRACT

A vehicle-electrical-apparatus, including: a service-brake-valve-device (SBVD) having an electropneumatic service-brake-device (ESBVD), which is an electronically-brake-pressure-regulated-brake-system (EBPRBS), having an ESBVD, a first-electronic-brake-control-device (EBCD), electropneumatic-modulators (EM) and pneumatic-wheel-brake actuators (PWBA); a sensor-device; the first-EBCD controls the EMs generating pneumatic brake-control-pressures (PBCP) for the PWBAs, and the ESBVD has a service-brake-actuation-member (SBAM) and an electrical-
(Continued)

channel containing an electrical-brake-value-transmitter, actuate-able by the SBAM, and a second-EBCD couples brake-request signals into the first-EBCD depending on the AS, and, within a pneumatic-service-brake-circuit, a pneumatic-channel in which a control-piston of the SBVD is loaded with a first-actuation-force (AF) by actuating the service-brake-actuation-member based on a driver brake-request, and the control-piston controls a double-seat valve of the SBVD to generate PBCPs for the PWBAs; generating a second AF that acts on the control-piston; brake slip/driving-dynamics-regulation are in the second-EBCD, the second-EBCD receives sensor-signals, and for braking requested, generating the second AF to perform a brake-slip and/or driving-dynamics-regulation.

18 Claims, 8 Drawing Sheets

(51) Int. Cl.

| | |
|---|---|
| *B60T 8/171* | (2006.01) |
| *B60T 13/68* | (2006.01) |
| *B60T 15/02* | (2006.01) |
| *B60W 10/06* | (2006.01) |
| *B60W 10/18* | (2012.01) |
| *B60W 10/20* | (2006.01) |
| *B60W 30/02* | (2012.01) |
| *B62D 15/02* | (2006.01) |

(52) U.S. Cl.
CPC ........... *B60T 15/027* (2013.01); *B60W 10/06* (2013.01); *B60W 10/18* (2013.01); *B60W 10/20* (2013.01); *B60W 30/02* (2013.01); *B62D 15/025* (2013.01); *B60T 2220/04* (2013.01); *B60T 2240/00* (2013.01); *B60T 2250/03* (2013.01); *B60T 2250/04* (2013.01); *B60T 2270/10* (2013.01); *B60T 2270/402* (2013.01); *B60W 2520/105* (2013.01); *B60W 2520/125* (2013.01); *B60W 2520/14* (2013.01); *B60W 2520/28* (2013.01); *B60W 2540/12* (2013.01)

(56) References Cited

U.S. PATENT DOCUMENTS

| | | |
|---|---|---|
| 2013/0320751 A1 | 12/2013 | Eberling et al. |
| 2013/0332075 A1 | 12/2013 | Eberling et al. |
| 2017/0267221 A1 | 9/2017 | Hecker et al. |

FOREIGN PATENT DOCUMENTS

| | | | |
|---|---|---|---|
| DE | 102014112014 A1 * | 2/2016 | ............ B60T 13/261 |
| DE | 102014112014 A1 | 2/2016 | |
| DE | 102014013756 C5 | 4/2018 | |
| EP | 3148854 B1 | 3/2018 | |
| JP | 2001071879 A | 3/2001 | |
| JP | 2006525172 A | 11/2006 | |
| JP | 2017019432 A | 1/2017 | |

* cited by examiner

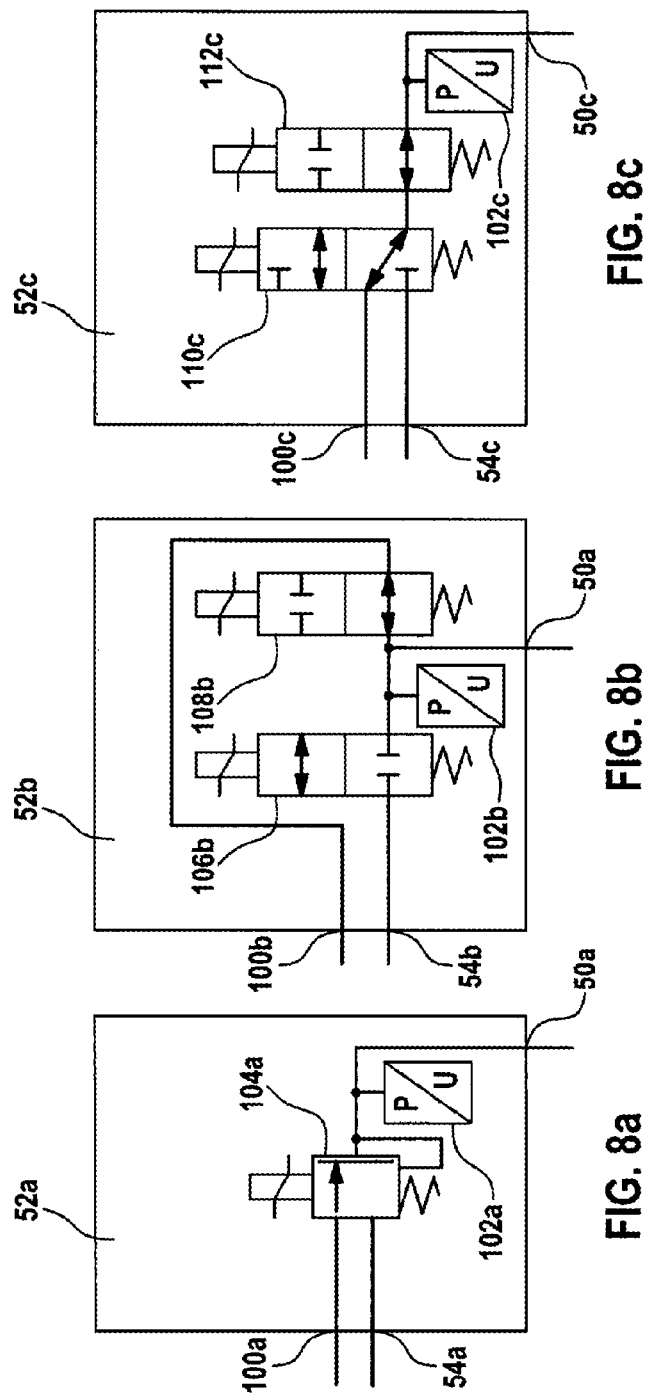

ELECTRICAL EQUIPMENT OF A VEHICLE HAVING REDUNDANT ABS AND DRIVING DYNAMICS CONTROL

FIELD OF THE INVENTION

The invention relates to an electrical apparatus of a vehicle and to a vehicle having such an electrical apparatus.

BACKGROUND INFORMATION

Such an electrical apparatus is discussed in DE 10 2014 112 014 A1. This deals with the case in which a pneumatic or electropneumatic service brake device is able to be actuated not only through a driver brake request, but also automatically through a driver assistance system such as for example an emergency braking assistant or automatic cruise control (ACC). In this case, an expanded service brake valve device or expanded footbrake module with at least one pneumatic channel is used, in which a control piston is able to be loaded not only through a first actuation force generated by actuating the footbrake pedal, but also additionally through a second actuation force that is generated electronically depending on driving operating conditions. The expanded service brake valve device is in particular provided with an electronic pressure control or regulation device by way of which it is possible to increase or reduce the brake or brake control pressure, generated in the at least one pneumatic channel, independently of the driver by way of the second actuation force acting on the control piston.

In this case, there have for some time been driver assistance systems such as traction control systems (TCS), emergency braking assistants (EMB), automatic cruise control (ACC) or vehicle dynamics regulation (ESC) by way of which steering and/or braking interventions may be made automatically and independently of the driver in order to ensure safety specifications, such as for example a certain minimum distance from a vehicle in front, a certain minimum braking action and a certain minimum driving stability.

For future vehicle traffic, there are also planned concepts that make it possible to move vehicles on public roads even completely without driver intervention, within the meaning of an "autopilot". In this case, a plurality of vehicles are intended to be controlled automatically at a distance between one another that is less than an actually prescribed safety standard (platooning). This is only possible when suitable communication between the vehicles allows all of them to brake at the same time and with the same deceleration.

In the context of such (partly) autonomous vehicle concepts, it is therefore necessary for the electrical apparatus of a vehicle to be able to receive and implement braking and/or steering requests electronically.

Based on this, the object of the invention is to develop an electrical apparatus described at the outset such that it guarantees the highest possible driving stability with high reliability against failure. The intention is also to provide a vehicle having such an electrical apparatus.

SUMMARY OF THE INVENTION

This object may be achieved according to the invention by the features as described herein.

The invention is based on an electrical apparatus of a vehicle, having:
a) a service brake device configured as an electropneumatic service brake device, in particular as an electronically brake pressure-regulated brake system (EBS), which contains an electropneumatic service brake valve device, a first electronic brake control device EBS-ECU, electropneumatic modulators and pneumatic wheel brake actuators, and having
b) a sensor device delivering sensor signals, comprising at least one of the following sensors: at least one wheel rotational speed sensor that records the wheel rotational speed of at least one vehicle wheel assigned thereto, a longitudinal acceleration sensor that records the longitudinal acceleration of the vehicle, a transverse acceleration sensor that records the transverse acceleration of the vehicle, a yaw rate sensor that records the yaw rate of the vehicle, a steering wheel angle sensor that records the steering wheel angle of a steering wheel of the vehicle, wherein
c) the first electronic brake control device EBS-ECU electrically controls the electropneumatic modulators and the electropneumatic modulators then generate pneumatic brake pressures or brake control pressures for the pneumatic wheel brake actuators, wherein
d) the electropneumatic service brake valve device has a service brake actuation member and, within at least one electrical service brake circuit, at least one electrical channel (130) containing at least one electrical brake value transmitter, able to be actuated by the service brake actuation member, for coupling out actuation signals depending on an actuation of the service brake actuation member, and at least one second electronic brake control device FBM-ECU, receiving the actuation signals and independent of the first electronic brake control device, which second electronic brake control device couples brake request signals into the first electronic brake control device EBS-ECU depending on the actuation signals, and, within at least one pneumatic service brake circuit, at least one pneumatic channel in which at least one control piston of the service brake valve device is loaded with a first actuation force through actuation of the service brake actuation member on the basis of a driver brake request, and the control piston directly or indirectly controls at least one double-seat valve, containing an inlet seat and an outlet seat, of the service brake valve device in order to generate pneumatic brake pressures or brake control pressures for the pneumatic wheel brake actuators, and wherein
e) a means containing the second electronic brake control device FBM-ECU of the electropneumatic service brake valve device is provided, which means generates a second actuation force, in the presence of braking requested independently of a driver brake request, that acts on the at least one control piston (12) in the same direction as or in the opposite direction to the first actuation force.

The at least one control piston of the service brake valve device is therefore additionally loaded, in addition to by the first actuation force and at least in the presence of braking requested independently of a driver brake request, by the second actuation force or, instead of the first actuation force, by the second actuation force, which acts in parallel with respect to the first actuation force and in the same direction or in the opposite direction on the at least one control piston.

In other words, the first actuation force depending on a driver brake request and/or, in the presence of a brake request independent of the driver request, the second actuation force act on the control piston of the service brake valve device in parallel, wherein the second actuation force is generated on the basis of electrical signals coupled out by the electronic control device of the service brake valve device. As a result, either both actuation forces (first and second actuation force) together or else each actuation force on its own without the presence of the respective other actuation force may actuate the control piston and therefore also the double-seat valve of the service brake valve. In this case, the two actuation forces may act in the same direction on the control piston or in the opposite direction.

The first actuation force generated depending on a driver brake request always acts on the at least one control piston in the same direction, specifically defined by the actuation direction of the brake actuation member in the direction of opening the outlet seat of the double-seat valve in order to aerate the at least one service brake circuit, as a result of which the terms "in the same direction" and "in the opposite direction" are clearly defined with respect to the direction of action of the first actuation force. It is clear in this case that, in the case of a non-existent first actuation force due to the absence of a driver brake request, the direction of action thereof on the at least one control piston is merely imaginary in order to be able to specify a reference for the direction of action of the second actuation force, which is then parallel thereto.

This results in further control possibilities for the electropneumatic service brake device, since the at least one pneumatic service brake circuit, in addition to actuation by the driver, is now able to be actuated automatically, electrically or electronically and thus without the involvement of the driver when a brake request is present. The at least one pneumatic service brake circuit of the electropneumatic service brake device may then be controlled or regulated by the electronic control device of the service brake valve device using any electrical control signals from any vehicle system or any "authority" that is able to generate a brake request.

The first electronic brake control device EBS-ECU may constitute central control electronics in which all higher functions, such as for example an axle load-dependent braking force distribution (ALB) or differential slip regulation and brake slip regulation routines (ABS routines) and/or driving dynamics regulation routines are implemented. For this purpose, the first electronic brake control device EBS-ECU receives the sensor signals from the sensor device and then actuates the electropneumatic modulators depending on these sensor signals, which modulators then generate pneumatic brake pressures or brake control pressures for the pneumatic wheel brake actuators. In this case, some of the brake slip regulation routines (ABS routines) may be implemented in local electronic controllers of the electropneumatic modulators, while for example the determination of the vehicle reference speed, required for the brake slip regulation (ABS), is carried out by the first electronic brake control device EBS-ECU to which the wheel speeds of all of the wheels are delivered by the sensor device.

A fault with or failure of the first electronic brake control device EBS-ECU or of the electrical energy supply thereto would therefore specifically not lead to a failure of the service brake device, due to the pneumatic fallback level in the electropneumatic service brake device. In the case of braking requested by the driver, such braking would then take place as purely pneumatically controlled emergency braking without brake slip control and without driving dynamics regulation. In the case of braking requested automatically by a driver assistance system, such as for example an autopilot, for example pneumatically controlled emergency braking would still likewise be ensured by the second actuation force on the control piston, but likewise without brake slip control and without driving dynamics regulation.

According to the invention, there is therefore provision that f) brake slip regulation routines and/or driving dynamics regulation routines are implemented in the second electronic brake control device FBM-ECU, and that g) the second electronic brake control device FBM-ECU receives sensor signals from the sensor device, and that h) in the presence of braking requested depending on driver braking or independently of a driver brake request, the means containing the second electronic brake control device FBM-ECU of the electropneumatic service brake valve device generates the second actuation force, including depending on the sensor signals received by the second electronic brake control device FBM-ECU, such that at least one brake slip regulation operation ABS and/or one driving dynamics regulation operation ESC is performed in the requested braking.

Therefore, the second electronic brake control device FBM-ECU, originally provided for the signals from the electrical brake value transmitter as a pure signal evaluation device or provided, according to DE 10 2014 112 014 A1, as a redundant implementation unit for brake request signals generated automatically by an autopilot device or a driver assistance system, now also constitutes complete redundancy, with regard to ABS and/or ESC functions, for the first electronic brake control device EBS-ECU. This redundancy is provided both for braking requested depending on driver braking by actuating a brake pedal or independently of a driver brake request, for example braking requested by an autopilot device or a driver assistance system.

In the event of the occurrence of a fault with or failure of the first electronic brake control device EBS-ECU or of the electrical energy supply thereto, the braking requested autonomously and without the involvement of the driver is then subjected to brake slip regulation or driving dynamics regulation. In the case of braking requested by the driver, this is then likewise subjected to brake slip regulation or driving dynamics regulation, provided that the second electronic brake control device FBM-ECU may be supplied with power by an independent electrical energy supply.

In the case of braking requested by actuating a brake pedal, the second electronic brake control device FBM-ECU already has the actuation signals generated by the electrical brake value transmitter of the service brake valve device depending on an actuation of the service brake actuation member in any case, from which actuation signals the second electronic brake control device FBM-ECU then forms corresponding brake request signals and then implements them either through the second actuation force in the at least one pneumatic channel of the electropneumatic service brake device or through electrical control of the electropneumatic modulators, supplied with power when intact, of the electropneumatic service brake device. In the latter case, the brake request signals from the second electronic brake control device FBM-ECU are then for example coupled into the electropneumatic modulators for example via the first electronic brake control device EBS-ECU, wherein the first electronic brake control device EBS-ECU daisy-chains the brake request signals to the pressure regulation modules via signal lines. To this end, a functionality or power supply of the first electronic brake control device EBS-ECU is not a necessary requirement, however.

In both cases, in order to perform the ABS function or the driving dynamics regulation function, the second electronic brake control device evaluates the sensor signals from the sensor device that are fed thereto, in a known way. The ABS brake slip regulation routine requires for example the wheel rotational speed signals from the wheels of the vehicle in order to set the brake slip per wheel or per axle to a predefined setpoint brake slip and receives these wheel rotational speed signals from the sensor device.

Brake slip regulation routines of a brake slip controller ABS are therefore understood to be regulation routines that set an impermissible deviation of the actual brake slip from the setpoint brake slip to a permissible deviation.

Similarly, for the driving dynamics regulation routines of the driving dynamics regulation system ESC, the steering wheel angle sensor delivers the driver request with regard to the direction of travel, and the wheel rotational speed sensors, the transverse acceleration sensor and the yaw rate sensor deliver the data describing the vehicle behavior. If an impermissible deviation of the actual driving behavior from the setpoint driving behavior is established according to the driver request, the driving dynamics regulation routines of the driving dynamics regulation system ESC intervene.

Driving dynamics regulation routines of a driving dynamics regulation system ESC are therefore understood to be regulation routines that set an impermissible deviation of the actual driving behavior from the setpoint driving behavior according to the driver request to a permissible deviation.

Oversteer is corrected for example by braking the front wheel further away from the curve, and understeer is corrected by braking the rear wheel closer to the curve. The wheel position in this case plays a dual role: firstly, the braking force on the side closer to the curve generates a yaw torque that supports turning in, and vice versa. Secondly, a braked wheel loses lateral steering capability, that is to say braking force on the rear axle supports turning in, and vice versa. In addition, the driving dynamics regulation routines of the driving dynamics controller ESC may also limit the drive power of the drive machine in order to reduce the vehicle speed and in order to prevent skidding of the drive wheels.

The driving dynamics regulation routines, implemented in the second electronic brake control device FBM-ECU, of the driving dynamics controller ESC may also contain a routine for regulating or controlling the drive power of a drive machine of the vehicle.

It is furthermore possible to use the invention as a retrofit solution for a pre-existing electrical apparatus of a vehicle by expanding the electronic evaluation device, which is present in any case, for the actuation signals from the electrical brake value transmitter with the routines of the described control/regulation operations. The changes to a pre-existing service brake valve device are then limited substantially to an additional pressure connection in the region above the pneumatic control piston. These changes may therefore be implemented with little tool and assembly investment for a pre-existing electrical apparatus or electropneumatic service brake device of a vehicle, without the relatively expensive pressure casting tools having to be changed for the housing of the service brake valve device. An additional housing for the second electronic brake control device FBM-ECU and for example for a solenoid valve device for generating the second actuation force may then in particular be flanged to the housing of the existing service brake valve device.

As an alternative, the second electronic brake control device FBM-ECU and for example the solenoid valve device for generating the second actuation force may of course be accommodated in the housing of the existing service brake valve device in order to create a structural unit.

Overall, this thereby guarantees high reliability against failure for the brake slip controller (ABS controller) or the driving dynamics controller ESC of the electropneumatic service brake device, without for instance an additional electronic control device having to be provided for this purpose, because the second electronic brake control device FBM-ECU is already present in any case as a signal evaluation device for the signals from the electrical brake value transmitter and the functionality thereof is merely expanded according to the invention in the context of a fully-fledged brake control device with an integrated ABS function and/or integrated ESC function.

Particularly, the brake slip regulation routines may be implemented in the second electronic brake control device FBM-ECU therefore generate the second actuation force, including depending on sensor signals from the at least one wheel rotational speed sensor, such that brake slip regulation (ABS) is performed in the requested braking.

Again, the driving dynamics regulation routines may be implemented in the second electronic brake control device FBM-ECU therefore generate the second actuation force, including depending on sensor signals from the at least one wheel rotational speed sensor, the at least one yaw rate sensor, the at least one transverse acceleration sensor and the at least one steering wheel angle sensor, such that driving dynamics regulation ESC is performed in the requested braking.

The features specified in the further dependent claims specify advantageous embodiments and refinements of the invention specified in claim 1.

The sensor signals may be supplied to the second electronic brake control device FBM-ECU according to various variants.

First of all, the sensor device may couple the sensor signals directly into the second electronic brake control device (FBM-ECU) for example by virtue of the fact that signal lines and, when necessary, also power supply lines are laid between the sensor device and the second electronic brake control device (FBM-ECU).

According to a further variant, at least one sensor of the sensor device may also be present in dual form, wherein a first sensor of the sensor present in dual form couples the sensor signals into the first electronic brake control device EBS-ECU and a second sensor of the sensor present in dual form couples the sensor signals into the second electronic brake control device FBM-ECU. In this case, the sensor signals are supplied to the first electronic brake control device EBS-ECU and the second electronic brake control device FBM-ECU in parallel, but by redundant and identical sensors. Both electronic brake control devices are then able to process the sensor signals from the sensor device independently of one another.

According to a further provision, the electrical apparatus may comprise an autopilot device or a driver assistance system that couples a brake request signal that triggers braking requested independently of a driver brake request and/or a steering request signal that triggers steering requested independently of a driver steering request directly or indirectly into the second electronic brake control device FBM-ECU, wherein the brake request signal and/or the steering request signal are/is generated depending on driving operating conditions.

An autopilot device should be understood to mean a device that controls or regulates at least the service brake device and a steering device of the vehicle without the involvement of the driver, in particular depending on driving operating conditions. A driver assistance system generally influences the yaw, roll and/or pitch behavior, the braking or acceleration behavior and also the distance and/or the relative speed with respect to a vehicle in front, and may be formed for example by an adaptive cruise control (ACC) system by way of which the distance or the relative speed with respect to a vehicle in front is kept constant, or else by an emergency braking assistant (AEBS), wherein and/or braking interventions may take place automatically and independently of the driver in order to ensure safety requirements, such as for example a certain minimum distance from a vehicle in front, a certain minimum braking action and a certain minimum driving stability.

"Driving operating conditions" are understood to be all conceivable conditions and circumstances that occur during driving operation of a vehicle, such as for example the yaw, roll and/or pitch behavior, the braking or acceleration behavior and also the distance and/or the relative speed with respect to a vehicle in front, but also the behavior when stationary or in a parked state.

The second electronic brake control device FBM-ECU therefore firstly implements the braking requested independently of a driver brake request using the means that generates the second actuation force on the at least one control piston of the service brake valve device.

The second electronic brake control device FBM-ECU, as electronic steering control device of an electromechanical steering device, then secondly implements steering requested independently of a driver steering request by receiving the corresponding steering request signal from the autopilot device or the driver assistance system and then actuating an electrical steering actuator depending thereon in order to steer the vehicle.

The electrical apparatus may therefore have an electromechanical steering device with or without a continuous mechanical connection between a steering wheel and a steering transmission, and with an electronic steering control device and an electrical steering actuator, wherein the electronic steering control device receives a steering request signal and actuates the electrical steering actuator so as to steer the vehicle depending on the steering request signal. The steering request signal may in this case be dependent on or independent of a driver steering request, as described above.

According to one development, steering control routines are implemented in the second electronic brake control device FBM-ECU, which generates the steering request signal depending on a steering request by the autopilot device, the driver assistance system or by the driver operating a steering wheel and then couples it into the electrical steering actuator.

Steering request signals generated with and without the involvement of the driver may therefore be coupled not only into the electronic steering control device of the steering device, but also into the second electronic brake control device FBM-ECU, or from the second electronic brake control device FBM-ECU, for example "jointly read" on a connected data bus.

The second electronic brake control device FBM-ECU may therefore also constitute redundancy for an electronic steering control device of the steering device when the electronic steering control device is intended to implement steering of the vehicle requested depending on or independently of a driver steering request (for example requested by an autopilot device or a driver assistance system) but is not functional or is not supplied with power.

According to a further variant, in order to supply the sensor signals from the sensor device to the second electronic brake control device FBM-ECU, evaluation electronics interacting with the sensor device may be provided, which evaluation electronics form sensor signals suitable for a data bus from the sensor signals delivered by the sensor device and couple them into a connected data bus to which at least the second electronic brake control device FBM-ECU is also connected.

The evaluation electronics may in this case be formed by any electronic control device, in particular also by the electronic controller of the autopilot device or the electronic controller of the driver assistance system, by the first electronic brake control device EBS-ECU, by the second electronic brake control device FBM-ECU or by the electronic steering control device.

According to one development of this provision, at least the following may be connected to the data bus: an electronic controller of the autopilot device and/or an electronic controller of the driver assistance system, the first electronic brake control device EBS-ECU, the second electronic brake control device FBM-ECU, the electronic steering control device, the electronics interacting with the sensor device and an engine controller of a drive machine of the vehicle.

Firstly, the sensor signals from the sensor device are then available on the data bus to which the second electronic brake control device FBM-ECU is also connected, which sensor signals are then used by the second electronic brake control device FBM-ECU to perform the ABS function and/or the driving dynamics regulation function. Secondly, the steering request signals are also available on the data bus, these being generated by the autopilot device or the driver assistance system automatically depending on the driving operating conditions or depending on the driver steering request. These steering request signals may then implement the second electronic brake control device FBM-ECU as redundancy, as described above, for the electronic steering control device by actuating the electrical steering actuator so as to steer the vehicle depending on the steering request signals.

In order to ensure "steering" and "braking" even in the event of a fault in the electrical energy supply, at least two energy supply circuits are required in a vehicle having the apparatus according to the invention, which energy supply circuits are configured such that there is still enough electrical energy present, in the event of a fault in one of the circuits, to be able to continue to perform "braking" and if necessary also "steering" of the vehicle.

The electropneumatic service brake device may therefore particularly be supplied with electrical energy by a first electrical energy source or by a first energy supply circuit that is independent of a second electrical energy source or a second energy supply circuit that supplies the electropneumatic service brake valve device with electrical energy.

The sensor device may in this case likewise be supplied with electrical energy by the second electrical energy source or by the second energy supply circuit.

If the first electrical energy source or the first energy supply circuit then fails and the first electronic brake control device EBS-ECU and the electropneumatic modulators are therefore without power, then the electropneumatic service brake valve device with the at least one electrical brake value transmitter and the second electronic brake control device EBS-ECU are supplied with electrical energy using the second electrical energy source. Electrical brake request signals depending on the driver brake request and independent of the driver brake request may then be implemented pneumatically, by the means containing the second electronic brake control device EBS-ECU, via the second actuation force in at least one pneumatic brake circuit, specifically with full ABS and/or driving dynamics regulation.

Again, if the electromechanical steering device may then likewise be supplied with electrical energy by the second electrical energy source or by the second energy supply circuit, then, even in the event of failure of the first electrical energy source or of the first energy supply circuit, electrical steering request signals depending on the driver steering request and independent of the driver steering request may then still be implemented by the steering device.

It is also essential that the driver is able to override the braking request brought about by the second actuation force at all times by actuating the brake actuation member of the service brake valve device, because the first actuation force, based on the driver brake request, is then applied to the at least one control piston in parallel with the second actuation force, said first actuation force under some circumstances being greater than the second actuation force and also being directed counter thereto.

This is because, in some cases, it may be desirable or necessary for the driver brake request, represented by the first actuation force on the control piston, to be overridden by generating a correspondingly great and counteracting second actuation force, for example when the driver, in the case of driving in a convoy with in each case a short distance from the vehicle in front and vehicle behind, suddenly wishes to initiate full braking, which would give rise to the risk of a rear-end collision.

Particularly, such a second actuation force may be also generated if an error with or failure of the electrical service brake circuit of the electropneumatic service brake device has been identified and if a brake request is present. The first electronic brake control device EBS-ECU, at least one electropneumatic axle modulator or even the electrical channel of the electropneumatic service brake valve device may in particular be affected by such a fault or failure. However, a failure of the electrical energy supply of the electrical service brake circuit is also conceivable.

It is understood that, in the case of a plurality of pneumatic channels of the service brake valve device, more than just a single control piston may also be loaded by the second actuation force, or also just a single control piston, which then transmits the second actuation force to a further actuation piston.

The means for generating the second actuation force may contain at least one electrical, electrohydraulic or electropneumatic actuator. In this case, embodiments are then conceivable in which the second actuation force is generated using an electropneumatic, electrohydraulic or electromechanical actuator, such as for example a solenoid valve, electric motor etc., which then acts directly or indirectly on the at least one control piston of the service brake valve device.

According to one development, the means for generating the second actuation force contain at least one electropneumatic solenoid valve device that couples out at least one pneumatic control pressure depending on the electrical signals for forming the second actuation force and on which control pressure the second actuation force depends. Upon a signal from the second electronic brake control device FBM-ECU of the service brake valve device, a control pressure that acts directly or indirectly on the at least one control piston is therefore coupled out. This control pressure then generates the second actuation force on the at least one control piston. Particularly, the second actuation force may therefore be generated electropneumatically, making the best possible use of the pre-existing conditions at the service brake valve device.

In particular, in this case, the control pressure coupled out by the at least one solenoid valve device is measured by a sensor system and regulated through comparison with a setpoint value in the second electronic brake control device FBM-ECU, wherein the sensor system and the solenoid valve device together with the second electronic brake control device FBM-ECU form a control pressure regulator for regulating the pneumatic control pressure.

Very generally speaking, there therefore may be provision for the second actuation force, acting on the at least one control piston, an actuation travel, resulting from the second actuation force, of the at least one control piston of the service brake valve device and/or a variable generating the second actuation force, for example the abovementioned pneumatic control variable, to be measured as an actual variable and compared with a setpoint variable within the sense of a regulation operation. By way of the regulation, which is optional here, of the second actuation force or one of the above variables linked thereto, it is possible to increase the accuracy of the setting of the brake pressure, in particular with regard to the ABS and driving dynamics regulation routines that are implemented.

In order to achieve such a regulation function, it is possible to provide sensor means by way of which the second actuation force acting on the at least one control piston, an actuation travel, resulting from the second actuation force, of the at least one control piston and/or a variable generating the second actuation force is measured as an actual variable, and regulation and adjustment means by way of which the actual variable is compared to a setpoint variable within the meaning of a regulation operation.

The pneumatic control pressure is in particular able to be coupled into at least one control chamber of the electropneumatic service brake valve device that is delimited by the at least one control piston, wherein the control chamber is arranged such that, when aerated, it brings about a second actuation force, in the same direction as or in the opposite direction to the first actuation force, on the at least one control piston.

In order to implement such a functionality as easily as possible, a first control chamber may furthermore be arranged with respect to the at least one control piston such that, by aerating the first control chamber, a second actuation force, in the same direction as the first actuation force, is generated on the at least one control piston. In addition, however, a second control chamber is arranged such that, by aerating the second control chamber, a second actuation force, in the opposite direction to the first actuation force, is generated on the at least one control piston.

In this case, there may be provision for the first control chamber to be able to be aerated or deaerated by way of a first solenoid valve device or by way of a first control pressure regulator and for the second control chamber, independently thereof, to be able to be aerated or deaerated by way of a second solenoid valve device or by way of a second control pressure regulator.

Last but not least, the at least one control piston may be a double piston with two pistons connected by a piston rod, of which a first piston delimits the first control chamber and of which a second piston delimits the second control chamber, wherein the first control chamber and the second control chamber bound surfaces facing away from one another of an inner wall of the service brake valve device that is penetrated by the piston rod in a sealing manner.

The invention also relates to a vehicle having such an electrical apparatus.

Advantageous developments of the invention will become apparent from the patent claims, the description and the drawings. The advantages, mentioned in the introductory part of the description, of features and of combinations of several features are merely exemplary and may, as an alternative or in addition, display their effect without the advantages necessarily having to be achieved by embodiments according to the invention. Further features may be derived from the drawings—in particular the illustrated geometries and the relative dimensions of several components with respect to one another and their relative arrangement and functional connection. The combination of features in different embodiments of the invention or of features of different patent claims is likewise possible in a manner deviating from the selected back-references of the patent claims and is hereby encouraged. This also applies to features that are illustrated in separate drawings or mentioned in the description thereof. These features may also be combined with features of different patent claims. Features mentioned in the patent claims may likewise be dispensed with for other embodiments of the invention.

Exemplary embodiments of the invention are illustrated below in the drawing and explained in more detail in the following description.

BRIEF DESCRIPTION OF THE DRAWINGS

FIGS. 8a, 8b and 8c show embodiments of a solenoid valve device for controlling the service brake valve device.

DETAILED DESCRIPTION

Figure 1:
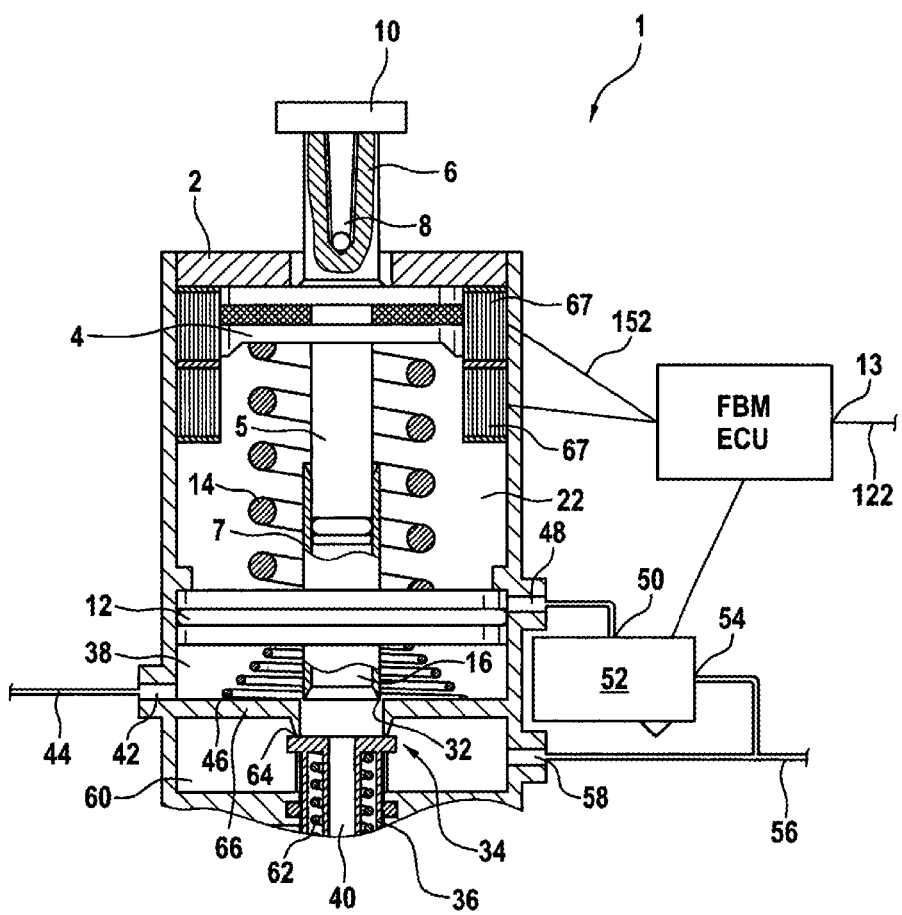
FIG. 1 shows a schematic cross-sectional illustration of a service brake valve device of an electropneumatic service brake device of a vehicle according to one exemplary embodiment of the invention in a "driving" setting.

FIG. 1 shows a schematic cross-sectional illustration of a service brake valve device 1 of an electropneumatic service brake device of an electrical apparatus of a vehicle according to one embodiment of the invention in a "driving" setting. Electrical apparatus should in this case be understood to mean any vehicle apparatus that has electrical parts or components, but may additionally also contain mechanical, pneumatic and hydraulic components.

Figure 2:
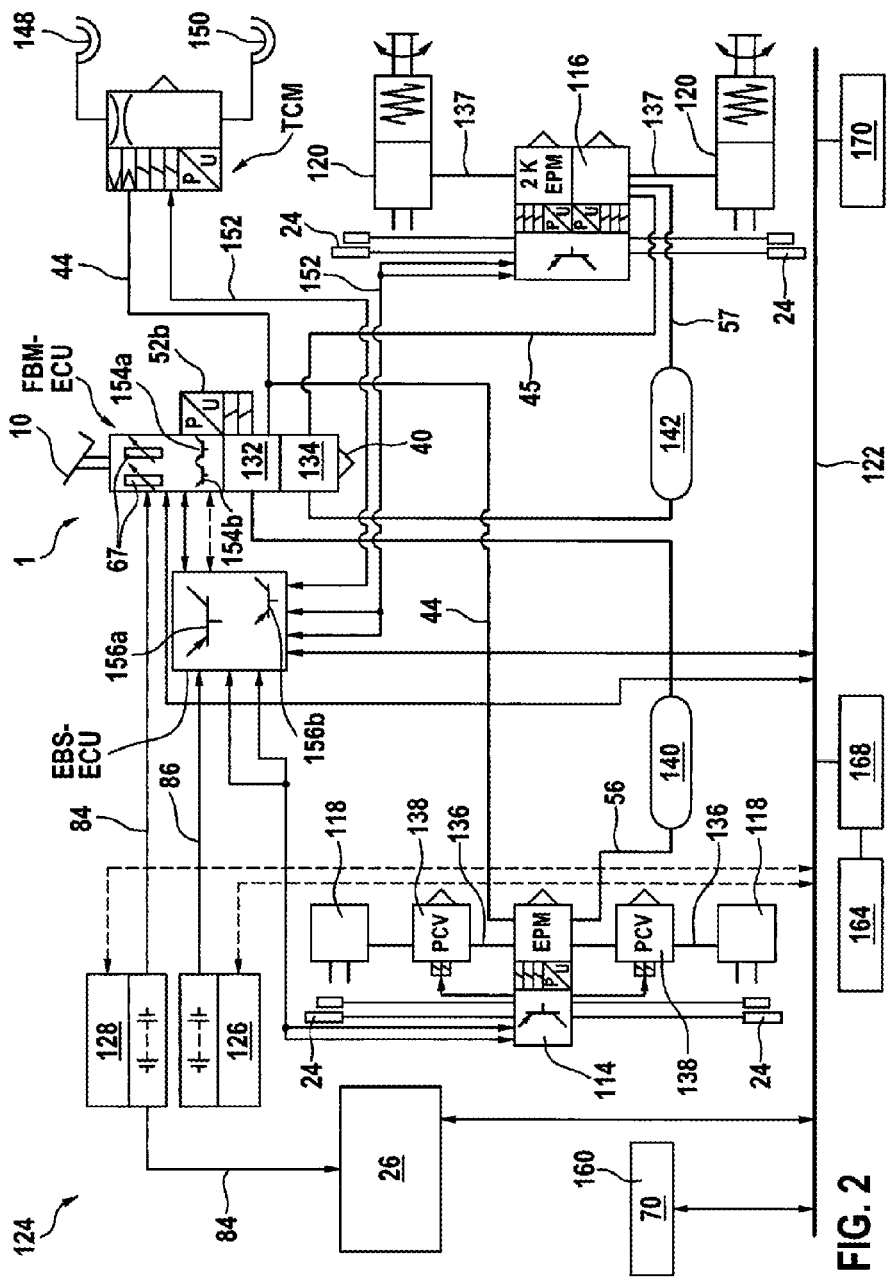
FIG. 2 shows a schematic circuit diagram of one exemplary embodiment of an electrical apparatus of a vehicle, which contains an electropneumatic service brake device having a service brake valve device according to FIG. 1 and an autopilot device and a steering device.

The service brake valve device 1, for the purpose of simplifying the drawing, has just one pneumatic service brake circuit or one pneumatic channel 132 or 134, but in reality may have two pneumatic service brake circuits or two pneumatic channels 132, 134 (see FIG. 2). In addition to the pneumatic service brake circuits or the pneumatic channels 132, 134, an electrical service brake circuit or an electrical channel 130, containing a travel recorder, which is contactless in this case for example, or brake value transmitter 67 for measuring the actuation travel of a service brake actuation member 10 is present. Reference is also made to what is known as a footbrake module (FBM) in the case of such an electropneumatic service brake valve device 1.

The service brake valve device 1 may be used in the electropneumatic service brake device 124 according to FIG. 2, which constitutes an electronic brake system (EBS) with brake pressure regulation, in order firstly, in two subordinate pneumatic (backup) service brake circuits, to couple in each case a pneumatic backup brake control pressure and secondly, in a superordinate electrical service brake circuit, to couple an electrical signal, depending on a brake request, into a first electronic brake control device EBS-ECU and from there, possibly in adjusted or corrected form, into downstream electropneumatic pressure regulation modules 114, 116, which couple out a corresponding actual brake pressure, depending on these electrical signals representing setpoint brake pressures, to wheel brake cylinders 118, 120 of the respectively associated axle (front axle, rear axle).

Such electropneumatic pressure regulation modules 114, 116 are well known and contain, in addition to a backup solenoid valve that maintains the associated backup brake control pressure when the electropneumatic brake circuit is intact, an inlet/outlet solenoid valve combination that is connected at output to a relay valve. In addition, a local electronic controller and a pressure sensor for measuring the actual brake pressure coupled out by the relay valve are integrated in such a pressure regulation module 114, 116. The actual brake pressure measured by the pressure sensor is then compared with a setpoint brake pressure, representing the signal coupled into the pressure regulation module 114, 116 from the electrical channel of the service brake valve device, within the meaning of a pressure regulation operation.

The service brake valve device 1 is therefore intended firstly to control the electrical service brake circuit and at least one pneumatic service brake circuit (backup brake circuit) of such an electronically regulated brake system (EBS).

The service brake valve device 1 has a housing 2 in which a plunger piston 4 with a plunger receptacle 6 projecting through a ceiling opening in a housing ceiling is accommodated in an axially movable manner. A plunger 8 projects from the top into the plunger receptacle 6 and is connected to a service brake actuation member 10 in the form of a footbrake plate. When the driver therefore actuates the footbrake plate 10, the plunger 8 presses into the plunger receptacle 6 and the plunger piston 4 is moved downward by the actuation force in FIG. 1.

The plunger piston 4 transmits the actuation force to a control piston 12 likewise mounted in an axially movable manner in the housing 2, which may be via a plunger piston compression spring 14. The control piston 12 is supported against the inner wall 66 by way of a control piston compression spring 46.

The control piston 12 is furthermore mechanically operationally connected to the plunger piston 4 via a plunger piston rod 5, wherein the plunger piston rod 5 is connected to the plunger piston 4 and is able to stop axially in an upper control piston rod 7, formed as a cup-shaped sleeve, of the control piston 12 when the plunger piston rod 5 has reached the base of the sleeve-shaped upper control piston rod 7, if for example the plunger piston 4 is moved toward the control piston 12 on account of actuation of the service brake actuation member. On the other hand, the plunger piston rod 5 may slide in the upper control piston rod 7 if the plunger piston 4 is moved away from the control piston 12.

On the other side of the control piston 12, on a lower control piston rod 16, there is formed an outlet seat 32 of a double-seat valve 34 that seals off a cup-shaped, hollow valve body 36, mounted in an axially movable manner in the housing 2, of the double-seat valve 34 or, when raised therefrom, releases a flow cross section between a working chamber 38 and a head-side through aperture in the valve body 36 that leads to a deaeration port 40. This situation is illustrated in FIG. 1.

The working chamber 38 is connected to a port 42 for a pneumatic service brake circuit to which a pressure line 44 or 45, leading to an electropneumatic pressure regulation module 114, 166 of an axle (front axle, rear axle), is connected (FIG. 2). A backup solenoid valve is integrated in such a pressure regulation module 114, 116 and blocks the pressure carried in the pressure line 44, 45, when the electrical service brake circuit is intact, from wheel brake cylinders 118 or 120 connected to the pressure regulation module 114, 116, and channels it in the event of a defective electrical service brake circuit. For this purpose, it is configured for example as a 2/2-way solenoid valve with an open position that is spring-loaded without power and an energized blocking position.

A control chamber 22 is formed between the plunger piston 4 and that surface of the control piston 12 that faces same. In this case, a port 48 on the housing 2 opens into the first control chamber 22.

An outlet port 50 of a solenoid valve device 52, which is connected at its inlet port 54 to a supply pressure line 56 connected to a compressed air supply, is connected to the port 48. Also present on the service brake valve device 1 is a supply port 58 to which the supply pressure line 56 is likewise connected and which is connected to a supply chamber 60.

The valve body 36 is urged, by way of a valve body compression spring 62 supported on the bottom of the housing 2 and on the inside of the valve body 36, against an inlet seat 64 of the double-seat valve 34, which is formed on a radially inner edge of a central through bore of a further inner wall 66 of the housing 2. In the state in which the valve body 36 is raised from the inlet seat 64 counter to the action of the valve body compression spring 62, a flow cross section is freed between the supply port 58 or the supply chamber 60 and the working chamber 38, thereby allowing a flow of compressed air at supply pressure into the port 42 for the service brake circuit, that is to say into the brake pressure line, in order to aerate the wheel brake cylinders of the axle in question or of the brake circuit in question.

As already mentioned above, the "driving" setting of the service brake valve device 1 is shown in FIG. 1, in which the outlet seat 32 is raised from the valve body 36 and the port 42 for the service brake circuit and therefore also the wheel brake cylinders thereof are connected to the deaeration port 40. As a result, the active pneumatic wheel brake cylinders of this brake circuit are deaerated and thus triggered.

The solenoid valve device 52, some embodiments of which are shown in FIG. 8a and FIG. 8b, allows the first control chamber 22 to be aerated or deaerated and is controlled by a second electronic brake control device FBM-ECU, which will be described in even more detail later on.

Two redundant travel sensors 67, which may be arranged axially behind one another and may be with contactless action, are furthermore arranged in the housing 2 in the axial region of the plunger piston 4 in the form of a brake value transmitter in order to measure the actuation travel thereof or the degree of actuation, which is proportional to the actuation travel or degree of actuation of the service brake actuation member 10. The signals from these travel sensors 67 are used for example in the electrical channel of the service brake valve device 1 and coupled into the second electronic brake control device FBM-ECU, which processes these signals and thereby for example makes them suitable for a data bus and couples them, via an interface 13, into a data communication line, for example a data bus 122 to which the first electronic brake control device EBS-ECU is connected. In this respect, the second electronic brake control device FBM-ECU (also) constitutes an electronic evaluation device for the signals from the travel sensors 67.

The second electronic brake control device FBM-ECU, the solenoid valve device 52 and the associated wiring or pneumatic line system or pneumatic lines may form, together with the components, arranged in the housing 2, of the service brake valve device 1, a structural unit, wherein the second electronic brake control device FBM-ECU, the solenoid valve device 52 and the associated wiring or pneumatic line system or pneumatic lines may also be accommodated in a dedicated housing, which is then for example flanged to the housing 2. As an alternative, a spatially separate arrangement of the housing 2 of the service brake valve device 1, on the one hand, and of the second electronic brake control device FBM-ECU and the first solenoid valve device 52, on the other hand, may also be provided. Finally, the second electronic brake control device FBM-ECU and the solenoid valve device 52 may also be integrated in the housing 2 of the service brake valve device 1.

If the driver then actuates the service brake actuation member 10 of the service brake valve device 1, which corresponds to a driver brake request, then the plunger piston 4 is displaced downward, wherein the plunger piston 5 is urged against the bottom of the cup-shaped sleeve 7 and the control piston 12 is likewise displaced downward until the outlet seat 32 seals off the valve body 36 and thus seals the connection between the port 42 for the service brake circuit and the deaeration port 40, such that no further deaeration of the associated wheel brake cylinders 118, 120 is able to take place.

In the event of further actuation of the service brake actuation member 10 upon the driver brake request, the valve body 36 is then urged downward with the outlet seat 32 bearing thereon, with the inlet seat 64 lifting up. As a result, compressed air at supply pressure travels from the supply chamber 60 into the working chamber 38 and from there into the port 42 for the service brake circuit or into the associated wheel brake cylinders in order to aerate them and thus activate them. In this case, this is pure driver braking in the case of which, on account of the actuation force exerted on the service brake actuation member 10 by the driver depending on the driver brake request, the plunger piston compression spring 14 exerts a first actuation force on the control piston 12, which ultimately puts it into its aeration position.

In the case of such braking initiated purely by a driver brake request, the solenoid valve device 52 is controlled, by way of the second electronic brake control device FBM-ECU, into the aeration position, in which the first control chamber 22 is connected to the atmosphere, in order to avoid pressure effects that arise due to the expansion of the first control chamber 22.

Depending on the modulation of the pneumatic control pressure coupled into the control chamber 22 by the solenoid valve device 52, it is then possible to set a defined second actuation force on the second control piston 12, which in turn results in a corresponding braking force, such that it is possible to set any braking force between the value zero and a maximum braking force resulting from the supply pressure in the supply pressure line 56 or 57. In the present case, the second actuation force acts for example in the same direction as and parallel to the first actuation force. An opposing direction of action of the second actuation force is however also conceivable.

If, in the embodiment of FIG. 1 without a driver brake request present, the solenoid valve device 52 is put into the aeration position by way of the second electronic brake control device FBM-ECU, the first control chamber 22 receives a pneumatic control pressure, which in turn generates a second actuation force, which is directed downward here, on the control piston 12, which then, like in the driver actuation described above, ultimately puts said control piston into its aeration position.

Furthermore, the control pressure prevailing in the first control chamber 22 then also acts back on the plunger piston 4 and therefore on the service brake actuation member 10, which the driver may sense on his foot when he touches the service brake actuation member 10 (pedal feedback effect). The driver is thus able to sense initiation of automatic braking.

In addition to service braking initiated by the driver and service braking initiated without the involvement of the driver on the basis of automatically generated service brake request signals, combined service braking is also conceivable, in which the service brake valve device 1 is used to perform braking both upon a driver brake request and upon an automatically generated brake request. Firstly the first actuation force from the driver service brake request and also the second actuation force from the automatically generated brake request then act on the control piston 12, for example here in the same direction and in parallel, as a result of which the contributions of the two actuation forces on the control piston 12 add together, for example.

The control pressure coupled out by the first solenoid valve device 52 for the first control chamber 22 may be subjected to pressure regulation. In this case, the actual control pressure at the outlet port 50 is measured using a pressure sensor and compared, by the second electronic brake control device FBM-ECU, against a predefined setpoint control pressure by correspondingly actuating the first solenoid valve device 52. The solenoid valve device 52 then forms, together with the pressure sensor and the second electronic brake control device FBM-ECU, a pressure regulator for the control pressure in the control chamber 22.

FIG. 8a to FIG. 8c now illustrate examples of solenoid valve devices 52a, 52b, 52c or control pressure regulators 52a, 52b, 52c as to how they control or regulate the pneumatic control pressure for the control chamber 22 in the preceding exemplary embodiments. For the sake of simplicity, in this case only the reference signs used in FIG. 1 are plotted.

The common features of these examples are that they are controlled by the second electronic brake control device FBM-ECU, have an inlet port 54a, 54b, 54c that is connected to the compressed air supply via the supply pressure line 56, and an outlet port 50a, 50b, 50c that is connected or put in connection in each case to the first control chamber 22 or to the second control chamber 24. Furthermore, all of the embodiments have a vent 100a, 100b, 100c and a pressure sensor 102a, 102b, 102c for measuring the actual control pressure at the outlet port 50a, 50b, 50c, such that pressure regulation on the coupled-out control pressure is possible and is also performed in connection with corresponding algorithms in the second electronic brake control device FBM-ECU to which the actual control pressure signal present at the outlet port 50a, 50b, 50c is reported.

In the embodiment of FIG. 8a, a proportional valve 104a provides for a coupled-out control pressure corresponding (proportionally) to the electrical control signal, at the outlet port 50a, wherein aeration and deaeration is likewise possible. In the embodiment of FIG. 8b, an inlet/outlet valve combination consisting of two 2/2-way solenoid valves 106b, 108b is provided, wherein the inlet valve 106b connected directly to the inlet port 54b is closed without energization and open with energization and the outlet valve 108b is open without energization and closed with energization. According to FIG. 8c, a 3/2-way solenoid valve 110c is used as solenoid valve device 52c, in the form of an aeration and deaeration valve with an aeration position and a deaeration position in combination with a 2/2-way solenoid valve 112c as holding valve, which keeps the pressure at the outlet port 50c in its blocking position.

Such a solenoid valve device 52a, 52b, 52c may be used in any of the embodiments described above in combination with the pressure sensor 102 as a control pressure regulator that includes the second electronic brake control device FBM-ECU in order to regulate the control pressure present at the output 50a, 50b, 50c.

FIG. 2 shows a schematic circuit diagram of one exemplary embodiment of an electropneumatic service brake device 124 of a traction vehicle suitable for the coupling of a trailer, having a service brake valve device 1 as described above. The service brake valve device 1 according to FIG. 1 is used merely by way of example, an electrical service brake circuit and two pneumatic service brake circuits being present there by way of example.

The electropneumatic service brake device 124 or its first electronic brake control device EBS-ECU is supplied with electrical energy by a first electrical energy source 126 that is part of the electrical service brake circuit and is independent of a second electrical energy source 128, which for example supplies the service brake valve device 1 and in particular its second electronic brake control device FBM-ECU with electrical energy.

In the service brake valve device 1, it is possible to see the electrical channel 130 for the electrical service brake circuit, the pneumatic front axle channel 132 for the pneumatic front axle service brake circuit, and the pneumatic rear axle channel 134 for the pneumatic rear axle service brake circuit. It is also possible to see the pressure lines 44, 45 that supply the pressure prevailing in the front axle channel 132 or in the rear axle channel 134 to the associated pressure regulation module 114 or 116, where this pressure is first of all blocked from the wheel brake cylinders 118, 120 by the integrated backup solenoid valve. The pressure regulation module 116 assigned to the rear axle is for example a 2-channel pressure regulation module, but by contrast a 1-channel pressure regulation module 114 is installed on the front axle and is connected to the wheel brake cylinders 118 on the front axle by way of brake pressure lines into which ABS pressure control valves 138 are integrated. The ABS pressure control valves, in the event of impermissible brake slip, are actuated in a known manner by the first electronic brake control device EBS-ECU in order to adjust the brake slip on the wheels of the front axle to a permissible brake slip. The brake slip on the wheels of the rear axle is regulated by way of the 2-channel pressure regulation module 116 located there, which is connected to the associated wheel brake cylinders via brake pressure lines 137. In order to measure wheel slip, wheel rotational speed sensors 24 are arranged on each wheel. Regulation routines of an ESC (electronic stability control), TCS (traction control system) and ABS (anti-lock braking system, brake slip regulation) regulation system are implemented for example in the first electronic brake control device EBS-ECU.

A respective dedicated compressed air supply 140, 142 may be provided for the two service brake circuits (front axle, rear axle), each of which is connected, via a supply pressure line 144, 146, firstly to the respective pneumatic channel 132, 134 of the service brake valve and secondly to the pressure regulation modules 114, 116. The pressure regulation modules 114, 116 contain an inlet/outlet valve combination and a relay valve pneumatically actuated thereby, wherein a brake pressure is modulated in each case depending on coupling-out by an actuation by the first electronic brake control device EBS-ECU from the supply pressure and coupled into the brake pressure lines 136. A pressure sensor is furthermore in each case integrated into the pressure regulation modules 114, 116 for each channel or in a trailer control module TCM, which pressure sensor measures the respective prevailing actual brake pressure in the brake pressure lines 136, 137 or at the "brake" coupling head and feeds it back into local electronic control devices that are each integrated in the pressure regulation modules 114, 116 or in the trailer control module TCM in order to be able to regulate the brake pressure though comparison with a setpoint brake pressure in a known manner.

Using for example the pressure line 44 assigned to the pneumatic front axle brake circuit, the well-known trailer control module TCM is redundantly controlled by compressed air, which trailer control module is likewise controlled electrically, as a priority, by the first electronic brake control device EBS-ECU. The trailer control module TCM is furthermore supplied with compressed air by a compressed air supply 140 or 142 by way of the compressed air supply line 144 or 146, this however not being shown in FIG. 2. At output, the trailer control module TCM is connected to a "brake" coupling head 148 and a "supply" coupling head 150 in order to control the trailer brakes in a known manner.

It is understood that the pressure regulation modules 114, 116, the trailer control module TCM and the ABS pressure control valves 138 are each connected to the first electronic brake control device EBS-ECU by way of an electrical control line 152.

It is also possible to see the service brake valve device 1, which may be configured for example according to FIG. 1, together with the second electronic brake control device FBM-ECU, for example integrated into it, and the solenoid valve device 52b, which contains an inlet/outlet valve combination 106b, 108b, for example according to FIG. 8b, and a pressure sensor 102b. In the exemplary embodiment that is shown, these components are accommodated for example in a dedicated housing that is flanged to the housing of the service brake valve device 1. Also furthermore visible are the brake value transmitters 67, present in redundant form. The second electronic brake control device FMB-ECU contains for example two redundant microprocessors 154a, 154b that monitor one another. In the same way, the first electronic brake control device EBS-ECU also has two redundant microprocessors 156a, 156b. The wheel rotational speed sensors 24 on the wheels furthermore report the respective wheel rotational speed to the local controllers in the pressure regulation modules 114, 116, which then forward them to the first electronic brake control device EBS-ECU.

Figure 4:
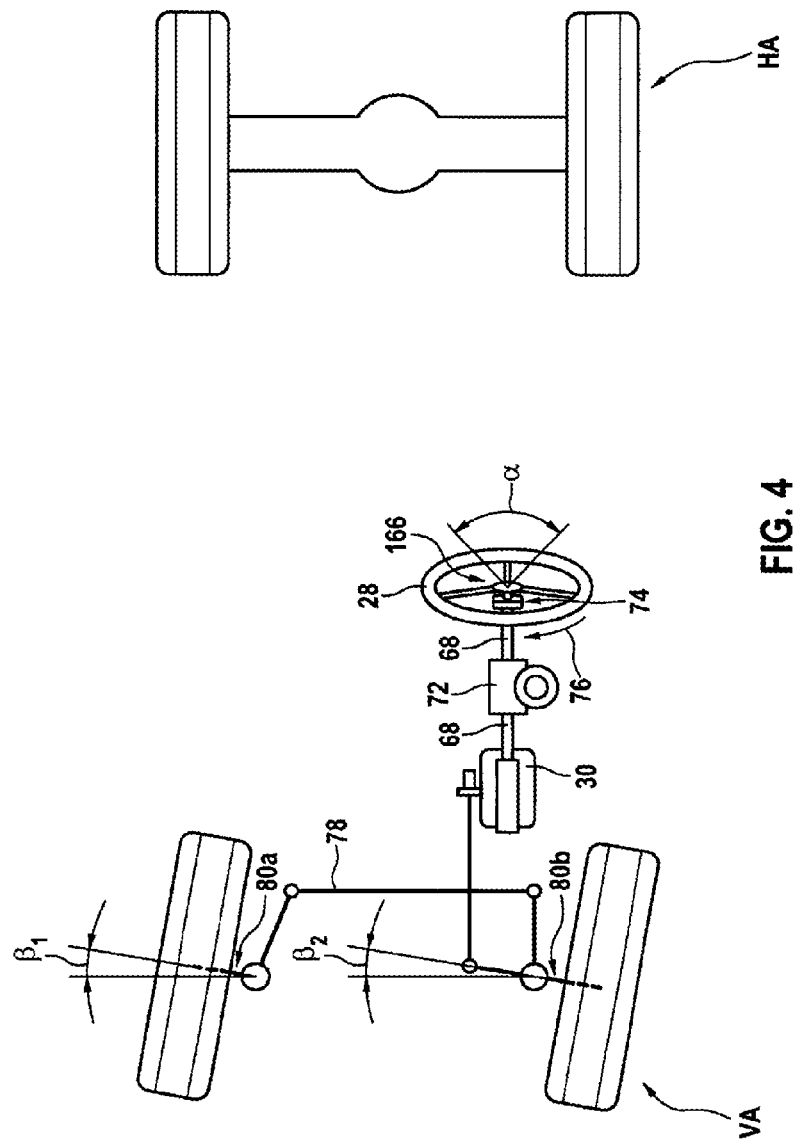
FIG. 4 shows the steering device in a situation in which the driver is steering.

The electrical apparatus furthermore comprises an electromechanical steering device 26 having for example a continuous mechanical connection between a steering wheel 28 and a steering transmission 30 (FIG. 4). An electronic steering controller 162 of the steering device 26 communicates with the data bus 122 to which the first electronic brake control device EBS-ECU, the second electronic brake control device FBM-ECU and an electronic controller 160 of an autopilot device 70 are also connected. The electronic controller 160 of the autopilot device 70 is configured to actuate, inter alia, the steering device 26, the electropneumatic service brake device 124 and the service brake valve device 1 or their controllers without the involvement of the driver, and therefore constitutes a driver assistance system. At least partly automatic control of the brakes and of the steering of the vehicle is thereby achieved, which may depend on driving operating conditions such as for example the vehicle speed, the distance and/or relative speed with respect to a vehicle in front, the vehicle stability, in particular together with the trailer, etc. To this end, the autopilot device 70 receives data relating to driving operating conditions via sensors that are not shown here.

The steering device 26 is supplied with electrical energy by the second energy source 128, as is the autopilot device 70 for example. The trailer control module TCM, which is controlled electrically by the first electronic brake control device EBS-ECU, is connected firstly to a "brake" coupling head 148 and secondly to a "supply" coupling head 150, wherein brake and supply lines corresponding to these coupling heads and leading to the trailer are connected detachably.

The electromechanical steering device 26 is shown in detail in FIG. 4. The steering wheel torque 76 applied by the driver via the steering wheel 28 is introduced, via a steering spindle 68, into an electrical steering actuator 72 that is formed for example by an electric motor. A steering wheel torque sensor 74 is furthermore attached to the steering spindle 68 and records the steering wheel torque applied in each case by the driver via the steering wheel 28 and couples it, as steering wheel torque signal, into the electronic steering controller 162 that is connected to the data bus 122 (FIG. 2).

The electronic steering controller 162 may in principle actuate the steering actuator 72 depending on the steering wheel torque 76 recorded on the steering wheel 28 in order to generate an additional overlaid torque on the steering column 68 with respect to the steering wheel torque 76 applied by the driver. The steering device therefore in this case for example constitutes what is known as overlaid steering with overlaid steering torque. Instead of the steering wheel torque 76, the respective steering wheel angle α may also be recorded by a steering wheel angle sensor, such that overlaid steering with steering wheel angle overlay would then be present.

Figure 5:
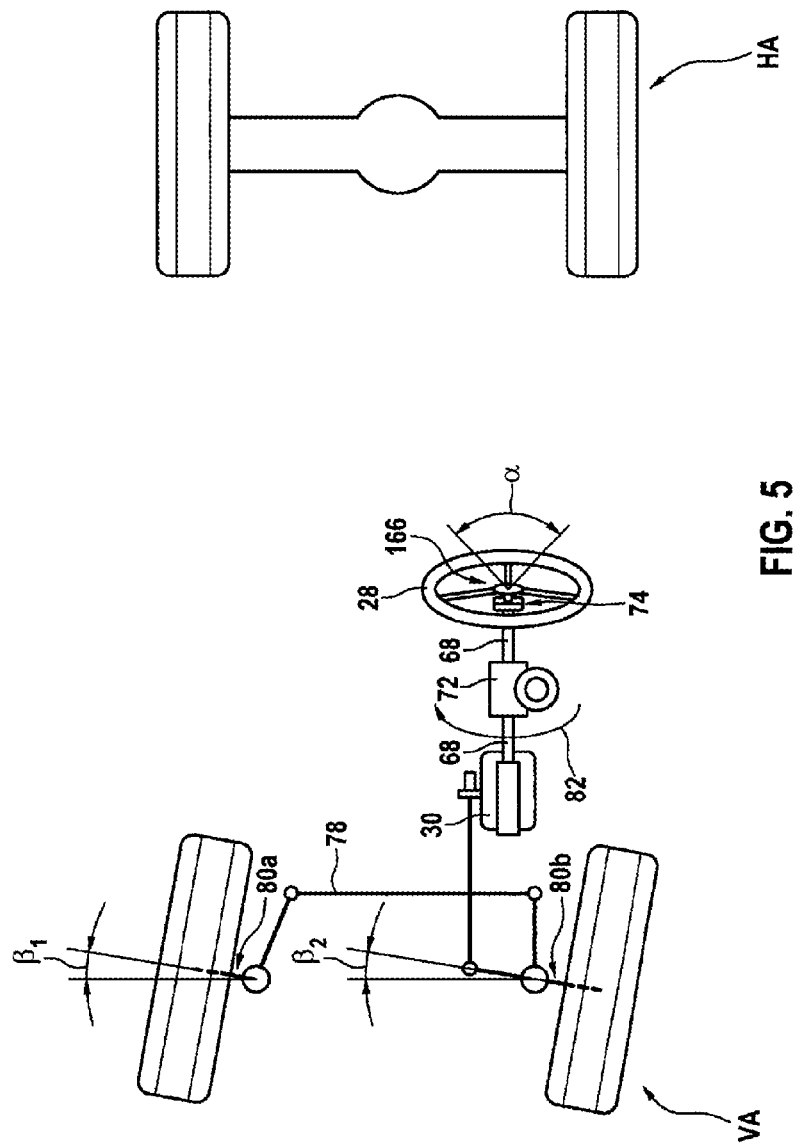
FIG. 5 shows the steering device in a situation in which the driver is steering.

However, the steering actuator 72 may also generate a steering torque 82 on the steering spindle 68 without the involvement of the driver, that is to say without actuation of the steering wheel 28 (FIG. 5). In the case present in FIG. 4, the steering actuator 72 does not couple any steering torque 82 into the steering spindle 68, such that the steering forces are derived solely from the steering wheel torque 76 generated by the driver. FIG. 4 shows the situation in which the steering request emanates solely from the driver, who actuates the steering wheel 28 accordingly.

The steering transmission 30 in this case may contain hydraulic servo-assistance and boosts the steering wheel torque 76. The steering transmission 30 then uses a steering rod 78 to actuate axle limbs 80a, 80b of the left-hand and right-hand front wheel of the steered front axle VA, in order to set a respective right and left steering angle $\beta_1$ and $\beta_2$ there. The rear axle HA is in this case may be unsteered.

FIG. 5 shows the situation in which the steering torque 82 acting on the steering spindle 68 is generated solely by the steering actuator 72 on the basis of the actuation thereof by the electronic steering controller 162. This actuation is performed for example by a steering request actuated by the autopilot device 70 and that is transmitted by way of the data bus 122.

Figure 6:
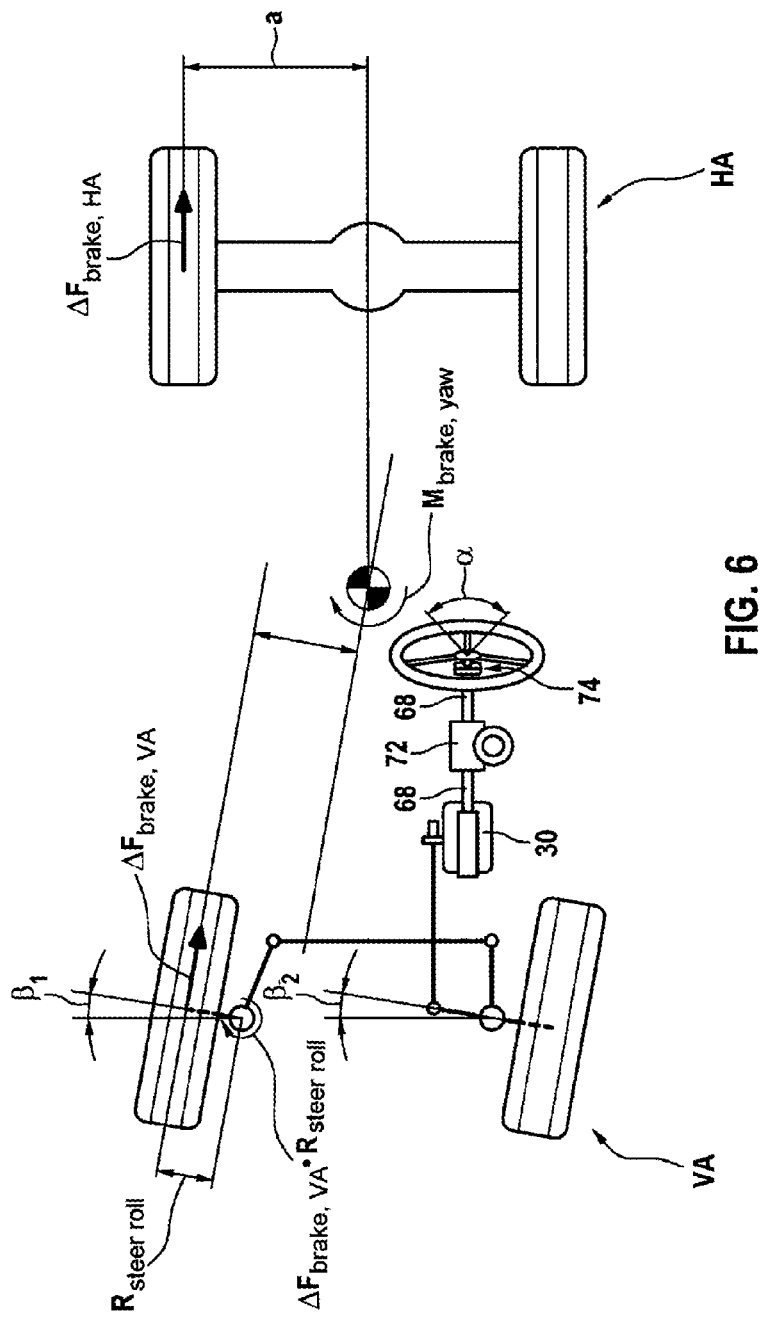
FIG. 6 shows the steering device in a situation in which the autopilot device is steering.

FIG. 6 shows what is called steered braking, in which a yaw torque $M_{brake,yaw}$ is generated through targeted braking here for example of the respective left-hand wheel on the front axle VA and on the rear axle HA, which yaw torque prompts the vehicle here for example to follow a road curving to the left. What are decisive for the yaw torque $M_{brake,yaw}$ are the steering roll radius $R_{steer\ roll}$ on the left-hand front wheel, which generates a braking torque $\Delta F_{brake,VA} \cdot R_{steer\ roll}$ in combination with the braking force $\Delta F_{brake,VA}$ acting there, and also the half axle length a, which generates a braking torque $\Delta F_{brake,HA} \cdot a$ in combination with the brake force $\Delta F_{brake,HA}$. The steered brake request is initiated here for example by the autopilot device 70 and transmits steering request signals, for example via the data bus 122, to the second electronic brake control device EBS-ECU, which then initiates braking of the two wheels.

Figure 7:
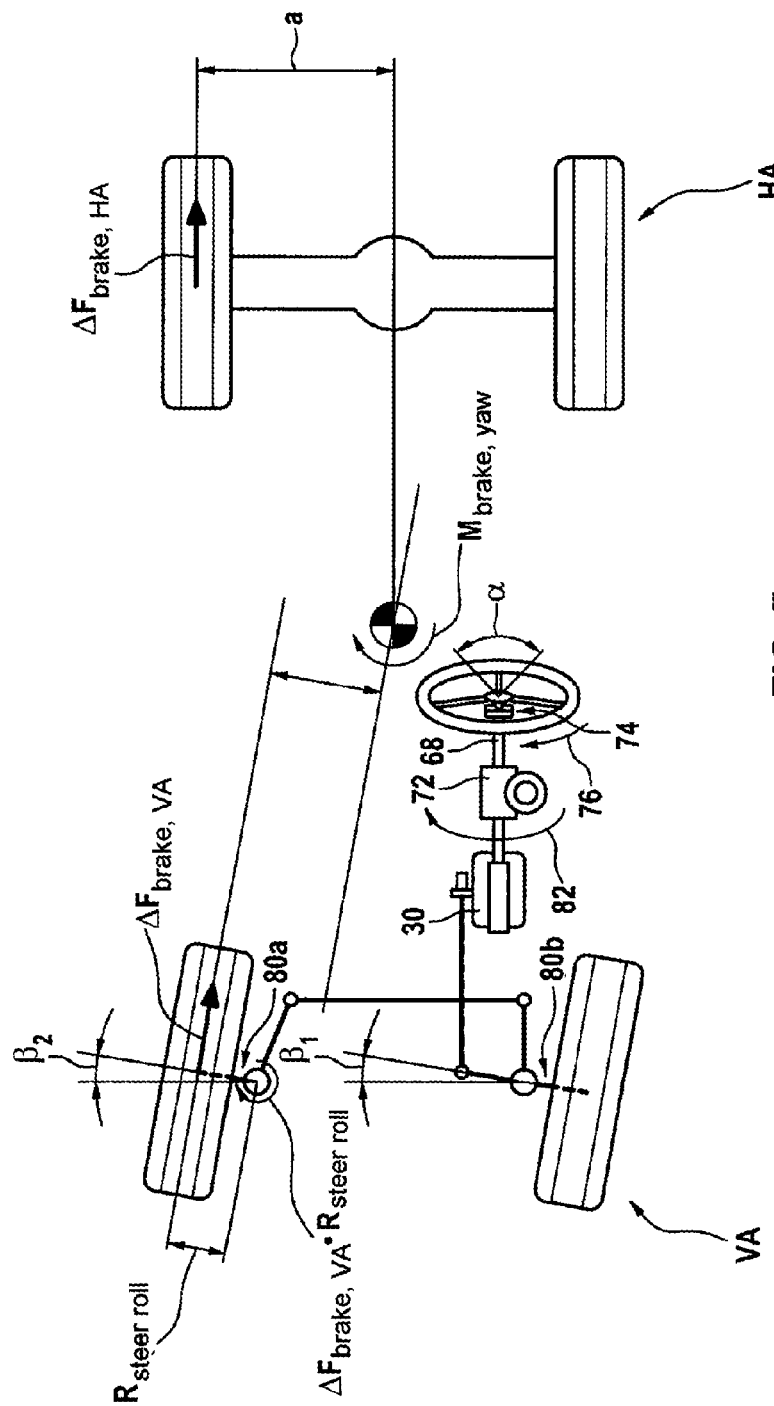
FIG. 7 shows the steering device in a situation in which the driver and the autopilot device are steering.

FIG. 7 illustrates the situation in which a steering wheel torque 76 applied to the steering spindle 68 by the driver via the steering wheel 28 is overlaid with a steering torque 82 applied by the steering actuator 72. A yaw torque $M_{brake,yaw}$ is also active due to steered braking. The case is therefore shown here in which the options, shown in FIG. 4 to FIG. 6, for steering the vehicle are overlaid with one another.

Figure 3:
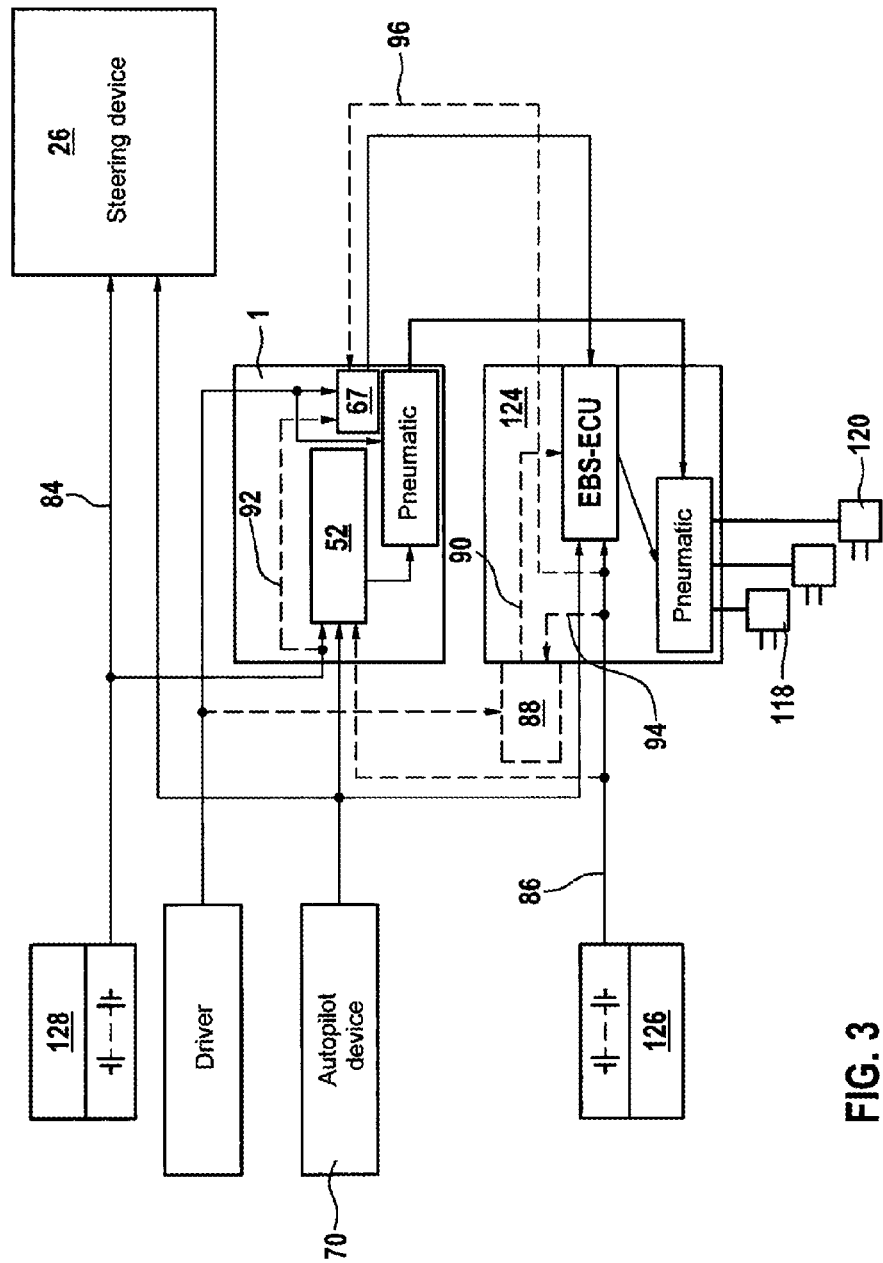
FIG. 3 shows a simplified schematic illustration of the electrical apparatus from FIG. 2.

FIG. 3 now schematically shows various embodiments of a power supply for the electrical and electronic components of the electrical apparatus of the vehicle.

According to a first embodiment, the steering device 26 and the service brake valve device 1 or its second electronic brake control device FBM-ECU are supplied with power by the second electrical energy source 128 and the electropneumatic service brake device 124 or its first electronic brake control device EBS-ECU are supplied with power by the first electrical energy source 126. The corresponding energy supply lines 84, 86 are identified in FIG. 3 in unbroken lines with triangular surface-shaped arrows. The brake value transmitter 67 of the service brake valve device 1 is here optionally likewise supplied with power by the second electrical energy source 128, as indicated by the energy supply line 92 identified in dashed form.

In this case, the electronic brake control device 1 of the electropneumatic service brake device 124 or its second electronic brake control device FBM-ECU is configured so as to detect a failure or fault in a second electrical energy supply circuit containing the second electrical energy source 128 or in the steering device 26, wherein the electronic brake control device 1 or its electronic control device FBM-ECU then actuates the electropneumatic service brake device 124 so that it implements steering request signals, possibly coupled out by the autopilot device 70, in the form of braking interventions, specific to the wheels or specific to the sides, on the wheel brake actuators.

According to a second embodiment, there is provision for at least one electrical signal transmitter 88 to be provided, said electrical signal transmitter being supplied for example with electrical energy by the first electrical energy source 126 or by the first energy supply circuit via an energy supply line 94 illustrated in dashed lines and able to be actuated by the service brake actuation member 10 and coupling an electrical actuation signal into the second electronic brake control device EBS-ECU when the service brake actuation member 10 is actuated via a signal line 90, shown in dashed lines in FIG. 3. In this case, the electrical signal transmitter 88 may be integrated into the electropneumatic service brake valve device 1 and in particular be formed by an electrical switch.

According to a third embodiment, at least one electrical signal transmitter 88 may be provided, said electrical signal transmitter being supplied with electrical energy by the first electrical energy source 126 or by the first energy supply circuit and being able to be actuated by pneumatic brake pressure or brake control pressure in one or both pneumatic service brake control circuit(s) and coupling an electrical actuation signal into the first electronic brake control device EBS-ECU when the service brake actuation member 10 is actuated. In this case, the electrical signal transmitter 88 may again be integrated into the electropneumatic service brake valve device 1 and in particular be formed by an electrical pressure sensor. This brake pressure or brake control pressure measured by the signal transmitter 88 is present in each of the pressure lines 44, 45 of the two pneumatic service brake circuits (FIG. 2). In the third embodiment, the brake value transmitter 67 of the service brake valve device 1 is supplied with power by the first electrical energy source 126, for example, via an energy supply line 96 illustrated in dashed lines.

In the second and third embodiment, the first electronic brake control device EBS-ECU is in particular configured to detect a failure or fault in the second electrical energy supply circuit containing the second electrical energy source 128 or in the steering device 26 and, when it detects such a fault and in the presence of an actuation signal generated by the signal transmitter 88, to ignore steering request signals potentially coupled out by the autopilot device 70 and not to implement them.

An additional signal transmitter 88 may therefore be provided with respect to the electrical brake value transmitter 67, which additional signal transmitter is supplied with electrical energy by the same first electrical supply circuit 126 as the electropneumatic service brake device 124 and detects that the driver wishes to brake. In this case, even in the event of a detected fault in the steering device 26, no steered braking intervention is performed, since the driver is obviously in his seat and is able to take over control. Braking is then performed only with the pneumatic service brake circuits of the electropneumatic service brake device 124.

According to a fourth embodiment, the electropneumatic service brake valve device 124 or its second electronic service brake control device EBS-ECU is additionally supplied with electrical energy by the first energy supply circuit containing the first electrical energy source 126. In this case, the brake value transmitter 67 of the service brake valve device 1 is supplied with power by the second electrical energy source 128 via the energy supply line 92.

In the third and fourth embodiment, the electrical service brake circuit of the electropneumatic service brake device 124, even in the event of failure of the first electrical supply circuit or of the first electrical energy source 126, receives the driver brake request and is able to implement it. The brake pressures may thereby be modified accordingly in the wheel brake actuators 118, 120 for steered braking, and both a driver brake request and a steering request are therefore implemented at the same time. These embodiments are therefore also suitable for providing redundancy of the servo-assistance in the steering transmission 30 of the steering device 26.

According to a further embodiment, the second electronic brake control device FBM-ECU of the service brake valve device 1 is configured to detect a failure or a fault in the first electrical energy supply circuit containing the first electrical energy source 126 or in the electrical service brake circuit of the electropneumatic service brake device 124, wherein the second electronic brake control device FBM-ECU then actuates the service brake valve device 1 so that this implements any brake request signals coupled out by the autopilot device 70 in the form of braking interventions on the wheel brake actuators 118, 120.

The operation of the electropneumatic service brake device 124 is furthermore as follows: if the superordinate electrical service brake circuit of the electropneumatic service brake device 124 is intact, in the event of a driver brake request by actuating the service brake actuation member 10, an electrical brake request signal is generated in the service brake valve device 1 by way of the brake value transmitter 67 and coupled into the second electronic brake control device FBM-ECU of the service brake valve device 1, where these signals are processed and introduced into the first electronic brake control device EBS-ECU via the data bus 122. The signals are corrected there by higher functions such as for example load-dependent brake force regulation (ALB), differential slip regulation, etc., and from there a signal representing a setpoint brake pressure is then coupled into the pressure regulation modules 114, 166 or the trailer control module TCM, where a corresponding brake pressure is modulated by correspondingly actuating the inlet/outlet valve combinations respectively present there from the supply pressure and channeled into the wheel brake cylinders 118, 120 in order to activate them accordingly. The actual brake pressure is measured by way of the pressure sensors integrated in the modules 114, 116, TCM and adjusted, within the meaning of brake pressure regulation, through comparison with the setpoint brake pressure that is present as a signal representing same in the local controllers. Said procedures therefore take place in the superordinate electrical service brake circuit.

In parallel therewith, a brake pressure is generated by actuating the service brake actuation member 10 in both pneumatic channels 132, 134 and then also in the pressure lines 44, 45 connected there in the manner already described above, which brake pressure however is still retained in the modules 114, 116, TCM by the backup solenoid valves switched into the blocking position when energized.

If a fault or defect then occurs in the superordinate electrical service brake circuit, whether this be the failure of the first energy source 126, the first electronic brake control device EBS-ECU or one of the local controllers in the modules 114, 116, TCM, then the backup solenoid valves integrated in these modules then switch without energization into their open position, as a result of which the brake pressures present in the pressure lines 44, 45 are channeled through the modules 114, 116, TCM to the wheel brake cylinders 118, 120 or to the "brake" coupling head in order to activate the wheel brakes in the traction vehicle or in the trailer. As a result, in the event of a defect in the electrical service brake circuit, the brakes are however now able to be actuated only by the driver, and then only purely pneumatically.

Furthermore, the second electronic brake control device FBM-ECU of the electropneumatic service brake valve device 1 is configured such that, when a fault with or failure of the superordinate electrical service brake circuit of the electropneumatic service brake device has been established and when a brake request is present, it actuates the solenoid valve device 52b in order, as described above, to generate a second actuation force on the control piston 12, which is capable, within a driver brake request, of lifting the valve body 36 from the inlet seat 64 in order to aerate the pressure lines 44, 45 leading to the modules 114, 116, TCM with an air pressure formed according to the second actuation force. Since the backup solenoid valves there are switched into their open positions without energization, this brake pressure then reaches the wheel brake cylinders 118, 120 or the "brake" coupling head 148.

Failure of or a fault with the electrical service brake circuit is in particular established within the context of self-monitoring by the first electronic brake control device EBS-ECU of the electropneumatic service brake device 124 itself or in the context of external monitoring by the second electronic brake control device FBM-ECU of the electropneumatic service brake valve device 1. External monitoring by an electronic control device of any third-party system is however also conceivable. The communication in this case may take place via the data bus 122. Since the second electronic brake control device FBM-ECU of the service brake valve device 1 is supplied with power by the second energy source 128, independent of the first energy source 126, this functionality is also not prevented by failure of the first energy source 126.

The second electrical energy source may be formed for example by a separate battery, (double-layer) capacitors, a further energy store or else a dedicated power generator (for example compressed air-driven generator). The second energy source may be monitored in terms of charging capacity and functionality (SOC, SOH, regular charging/discharging). This monitoring may be performed for example by way of the first electronic brake control device EBS-ECU of the electropneumatic service brake device 124, of the second electronic brake control device FBM-ECU of the service brake valve device 1 or by way of another system, such as for example the battery monitor of a hybrid drivetrain controller of the vehicle.

The brake request may in this case emanate from any system of the vehicle, in this case in particular from the autopilot device 70 or for example also from an adaptive cruise control (ACC) system by way of which the distance or the relative speed with respect to a vehicle in front is kept constant. The functionality of such an ACC system is then also able to be maintained when the electrical service brake circuit of the service brake device 124 has failed.

The automatically generated brake request or the automatically generated brake request signal may then be coupled into the second electronic brake control device FBM-ECU of the service brake valve device 1 via the data bus 122 and the interface 13 as electrical brake request signal in order to generate the second actuation force on the control piston 12. Since this interface 13 may be connected to the data bus 122, by way of which communication takes place not only with the first electronic brake control device EBS-ECU of the service brake device 124 but also with electronic control devices of a number of further electronic vehicle systems, which may in particular comprise an electronic controller 160 of the autopilot device 70 or an electronic controller of a driver assistance system such as ACC, the brake request signal may be generated automatically by any system of the traction vehicle.

A sensor device 164 illustrated schematically in FIG. 2 and delivering sensor signals comprises at least one of the following sensors: the wheel rotational speed sensors 24, which record the wheel rotational speeds of the associated vehicle wheels, a longitudinal acceleration sensor, not shown explicitly here, which records the longitudinal acceleration of the vehicle, a transverse acceleration sensor, not shown explicitly here, which records the transverse acceleration of the vehicle, a yaw rate sensor, not shown explicitly here, which records the yaw rate of the vehicle, and a steering wheel angle sensor 166, shown in FIG. 4 to FIG. 7, which records the steering wheel angle α of the steering wheel 28 of the vehicle. The sensor device 164 is in particular connected to the data bus 122 via evaluation electronics 168 that create sensor signals suitable for a data bus. In this case, the evaluation electronics 168 may in particular be integrated into the sensor device 164.

There is provision for brake slip regulation routines and driving dynamics regulation routines to be implemented in the second electronic brake control device FBM-ECU. As an alternative, only brake slip regulation routines or only driving dynamics regulation routines may also be integrated there.

The second electronic brake control device FBM-ECU furthermore receives sensor signals from the sensor device 164 via the data bus 122. In the presence of braking requested depending on a driver brake request or independently of a driver brake request, the second electronic brake control device FBM-ECU of the electropneumatic service brake valve device 1 may then also generate the second actuation force depending on the sensor signals received by the second electronic brake control device FBM-ECU such that at least one brake slip regulation operation ABS and/or one driving dynamics regulation operation ESC is/are performed in the requested braking.

The second electronic brake control device FBM-ECU, previously provided for a redundant implementation of the brake request signals generated automatically by the autopilot device 70, then also constitutes complete redundancy, with regard to ABS and/or ESC functions, for the first electronic brake control device EBS-ECU. This redundancy is provided both for brake request signals that are based on braking requested depending on driver braking by actuating a brake pedal or that are based on braking requested independently of a driver brake request, such as for example here by the autopilot device 70.

In the case of braking requested by actuating the service brake actuation member 10, the second electronic brake control device FBM-ECU already has the actuation signals from the electrical travel sensors 67 of the service brake valve device 1 in any case, from which actuation signals the second electronic brake control device FMB-ECU then forms corresponding brake request signals and then implements them either via the second actuation force in the at least one pneumatic channel of the electropneumatic service brake device 1 or via the electrical control of the pressure regulation modules 114, 116 in the electrical channel of the electropneumatic service brake device 124. In the latter case, the brake request signals from the second electronic brake control device FBM-ECU are then for example coupled into the pressure control modules 114, 116 via the data bus 122 and via the first electronic brake control device EBS-ECU, wherein the first electronic brake control device EBS-ECU just daisy-chains the brake request signals to the pressure control modules 114, 116 via signal lines that are not shown here. For this purpose, a functionality or power supply of the first electronic brake control device EBS-ECU is however not a necessary requirement.

In both cases, in order to implement the ABS function or the driving dynamics regulation function, the second electronic brake control device FBM-ECU evaluates the sensor signals from the sensor device 164, which sensor signals are fed thereto in this case for example via the data bus 122, in a known manner. The ABS brake slip regulation routines require for example the wheel rotational speed signals from the wheel rotational speed sensors 24 on the wheels of the vehicle in order to set the brake slip per wheel or per axle to a predefined setpoint brake slip, and receives these wheel rotational speed signals from the sensor device 164.

For the driving dynamics regulation system ESC, the steering wheel angle sensor 166 delivers the driver request in terms of the direction of travel, and the wheel rotational speed sensors 24, the transverse acceleration sensor and the yaw rate sensor deliver the data describing the vehicle behavior. If an impermissible deviation of the actual driving behavior from the setpoint driving behavior according to the driver request is established, the driving dynamics regulation system ESC intervenes. In addition, the driving dynamics regulation system ESC may also limit the drive power of the drive machine in order to reduce the vehicle speed and in order to prevent skidding of the drive wheels. For this purpose, the second electronic brake control device FBM-ECU may communicate, via the data bus 122, with an engine controller 170 connected to the data bus 122. The driving dynamics regulation routines implemented in the second electronic brake control device FBM-ECU therefore may also contain a routine for regulating or controlling the drive power of a drive machine of the vehicle.

Particularly, the brake slip regulation routines may be implemented in the second electronic brake control device FBM-ECU therefore also generate the second actuation force depending on sensor signals from the wheel rotational speed sensors 24, such that brake slip control (ABS) is performed in the event of braking requested via the second electronic brake control device FBM-ECU.

Again, the driving dynamics regulation routines may be implemented in the second electronic brake control device FBM-ECU therefore also generate the second actuation force depending on sensor signals from the wheel rotational speed sensors 24, the at least one yaw rate sensor, the at least one transverse acceleration sensor and the at least one steering wheel angle sensor, such that driving dynamics regulation ESC is performed in the event of braking requested via the second electronic brake control device FBM-ECU.

Instead of via the data bus, the sensor signals from the second electronic brake control device FBM-ECU may also be supplied in different, alternative ways. Firstly, the sensor device 164 may couple the sensor signals into the second electronic brake control device FBM-ECU, specifically directly, for example by signal lines and if necessary also power supply lines being laid between the sensor device 164 and the second electronic brake control device FBM-ECU.

According to a further variant, the sensors of the sensor device 164 may also be present in dual form, wherein a first sensor of a sensor present in dual form couples the sensor signals into the first electronic brake control device EBS-ECU and a second sensor of the sensor present in dual form couples the sensor signals into the second electronic brake control device FBM-ECU.

The autopilot device 70 or its electronic controller 160 may then couple a brake request signal, triggering braking requested independently of a driver brake request, and/or a steering request signal, triggering steering requested independently a driver steering request, into the second electronic brake control device FBM-ECU via the data bus 122, wherein the brake request signal and/or the steering request signal is/are generated depending on driving operating conditions.

The second electronic brake control device FBM-ECU then firstly implements the braking requested by the autopilot device 70 independently of a driver brake request through the solenoid valve device 52, which generates the second actuation force on the control piston 12 of the service brake valve device 1.

Secondly, the second electronic brake control device FBM-ECU then implements the steering request signal coupled out by the autopilot device 70 for example by actuating the electrical steering actuator 72 via the data bus 122 so as to steer the vehicle. The steering request signal is in this case for example looped from the data bus 122 through the electronic steering controller 162 into the steering actuator 72, without the latter having to be functional or supplied with power for this purpose.

Therefore, steering control routines are also implemented for example in the second electronic brake control device FBM-ECU, which generates the steering request signal depending on a steering request by the autopilot device 70 or through operation of the steering wheel 28 by the driver and couples it into the steering actuator 72.

Therefore, the steering request signals generated with and without the involvement of the driver are coupled not only into the steering device 26 but also into the second electronic brake control device FBM-ECU, or "jointly read" by the second electronic brake control device FBM-ECU.

The second electronic brake control device FBM-ECU therefore constitutes redundancy for the electronic steering controller 162 of the electromechanical steering device 26 when the electronic steering controller 162 is intended to implement a steering request signal generated depending on or independent of a driver steering request but is not functional or not supplied with power.

If the first electrical energy source 126 therefore fails and therefore the first electronic brake control device EBS-ECU and the pressure regulation modules 114, 116 are not powered, then the second electrical energy source 128 is used to supply the electropneumatic service brake valve device 1 with the travel sensors 67 and the second electronic brake control device EBS-ECU with electrical energy. Electrical brake request signals depending on the driver brake request and independent of the driver brake request are then implemented pneumatically by the second electronic brake control device EBS-ECU, the solenoid valve device 52 and the second actuation force generated thereby in the pneumatic brake circuits, specifically with full ABS and/or driving dynamics regulation.

Again, if the electromechanical steering device 26 is then likewise supplied with electrical energy by the second electrical energy source 128, then electrical steering request signals depending on the driver steering request and independent of the driver steering request may still be implemented by the electromechanical steering device 26 even in the event of failure of the first electrical energy source 126. The electrical steering request signals may then in particular be implemented even without a functional electronic steering controller 162, as has already been described above.

The LIST OF REFERENCE SIGNS is as follows:
EBS-ECU first electronic braking control device
FBM-ECU second electronic braking control device
TCM trailer control module
α steering wheel angle
1 service brake valve device
2 housing
4 plunger piston
5 plunger piston rod
6 piston receptacle
7 upper control piston rod
8 plunger
10 service brake actuation member
12 control piston
13 electrical connection
14 plunger piston compression spring
16 lower control piston rod
22 control chamber
24 wheel rotational speed sensor
26 steering device
28 steering wheel
30 steering transmission
32 outlet seat
34 double-seat valve
36 valve body
38 working chamber
40 deaeration port
42 service brake circuit port
44 brake pressure line
45 brake pressure line
46 control piston compression spring
48 port
50 outlet port
52 solenoid valve device
54 inlet port
56 supply pressure line
57 supply pressure line
58 supply port
60 supply chamber
62 valve body compression spring
64 inlet seat
66 inner wall
67 travel sensor
68 steering spindle
70 autopilot device
72 steering actuator
74 steering wheel angle sensor
76 steering wheel torque
78 steering rod
80a/b axle limb
82 steering torque
84 energy supply line
86 energy supply line
88 signal transmitter
90 signal line
92 energy supply line
94 energy supply line
96 energy supply line
104 proportional valve
106 2/2-way solenoid valve
108 2/2-way solenoid valve
110 3/2-way solenoid valve
112 2/2-way solenoid valve
114 pressure regulation module
116 pressure regulation module
118 wheel brake cylinder
120 wheel brake cylinder
122 data bus
124 service brake device
126 first energy source 128 second energy source
130 electrical channel
132 pneumatic front axle channel
134 pneumatic rear axle channel
136 brake pressure lines
137 brake pressure lines
138 ABS pressure control valves
140 compressed air supply
142 compressed air supply
144 supply pressure line
146 supply pressure line
148 "brake" coupling head
150 "supply" coupling head
152 control line
154a/b microprocessors
156a/b microprocessors
160 electronic controller
162 electronic steering controller
164 sensor device
166 steering wheel angle sensor
168 evaluation electronics
170 engine controller

The invention claimed is:

1. An electrical apparatus of a vehicle, comprising:
   a) a service brake device includes an electropneumatic service brake device, which is an electronically brake pressure-regulated brake system, which contains an electropneumatic service brake valve device, a first electronic brake control device, electropneumatic modulators and pneumatic wheel brake actuators;
   b) a sensor device to deliver sensor signals, including at least one of the following sensors: at least one wheel rotational speed sensor that records the wheel rotational speed of at least one vehicle wheel assigned thereto, a longitudinal acceleration sensor that records the longitudinal acceleration of the vehicle, a transverse acceleration sensor that records the transverse acceleration of the vehicle, a yaw rate sensor that records the yaw rate of the vehicle, or a steering wheel angle sensor that records the steering wheel angle of a steering wheel of the vehicle, wherein:
   c) the first electronic brake control device is configured to electrically control the electropneumatic modulators and the electropneumatic modulators then generate pneumatic brake pressures or brake control pressures for the pneumatic wheel brake actuators, and
   d) the electropneumatic service brake valve device has a service brake actuation member and, within at least one electrical service brake circuit, at least one electrical channel containing at least one electrical brake value transmitter, able to be actuated by the service brake actuation member, for coupling out actuation signals depending on an actuation of the service brake actuation member, and at least one second electronic brake control device, receiving the actuation signals and independent of the first electronic brake control device, which second electronic brake control device couples brake request signals into the first electronic brake control device depending on the actuation signals, and, within at least one pneumatic service brake circuit, at least one pneumatic channel in which at least one control piston of the service brake valve device is loaded with a first actuation force by actuating the service brake actuation member on the basis of a driver brake request, and the control piston directly or indirectly controls at least one double-seat valve, containing an inlet seat and an outlet seat, of the service brake valve device to generate pneumatic brake pressures or brake control pressures for the pneumatic wheel brake actuators;
   e) a means, containing the second electronic brake control device of the electropneumatic service brake valve device, to generate a second actuation force, at least in the presence of braking requested independently of a driver brake request, that acts on the at least one control piston in the same direction as or in the opposite direction to the first actuation force;
   wherein:
   f) brake slip regulation routines and driving dynamics regulation routines are implemented in the second electronic brake control device,
   g) the second electronic brake control device receives sensor signals from the sensor device, and
   h) in the presence of braking requested depending on driver braking or requested independently of a driver brake request, the means, containing the second electronic brake control device of the electropneumatic service brake valve device, generates the second actuation force, including depending on the sensor signals received by the second electronic brake control device, such that at least one brake slip regulation operation and driving dynamics regulation operation is performed in the requested braking;
   wherein the electropneumatic service brake device is supplied with electrical energy by a first energy supply source that is independent of a second energy supply source that supplies the electropneumatic service brake valve device and the sensor device with electrical energy, and
   wherein the first electronic brake control device is configured to detect a fault in a second electrical energy supply circuit containing the second electrical energy source or in a steering device, and, when it detects such a fault and in the presence of an actuation signal generated by the signal transmitter, to ignore steering request signals potentially coupled out by an autopilot device and not to implement the steering request signals.

2. The electrical apparatus of claim 1, wherein the brake slip control routines implemented in the second electronic brake control device generate the second actuation force, including depending on sensor signals from the at least one wheel rotational speed sensor, such that brake slip regulation is performed in the event of braking requested via the second electronic brake control device.

3. The electrical apparatus of claim 1, wherein the driving dynamics regulation routines implemented in the second electronic brake control device generate the second actuation force, including depending on sensor signals from the at least one wheel rotational speed sensor, the at least one yaw rate sensor, the at least one transverse acceleration sensor and the at least one steering wheel angle sensor such that driving dynamics regulation is performed in the event of braking requested via the second electronic brake control device.

4. The electrical apparatus of claim 3, wherein the driving dynamics regulation routines implemented in the second electronic brake control device also contain a routine for regulating or controlling the drive power of a drive machine of the vehicle.

5. The electrical apparatus of claim 1, wherein the sensor device couples the sensor signals directly into the second electronic brake control device.

6. The electrical apparatus of claim 1, wherein at least one sensor of the sensor device is in dual form, and wherein a first sensor of the sensor present in dual form couples the sensor signals into the first electronic brake control device and a second sensor of the sensor present in dual form couples the sensor signals into the second electronic brake control device.

7. The electrical apparatus of claim 1, further comprising:
an autopilot device or a driver assistance system to couple a brake request signal that triggers braking requested independently of a driver brake request and/or a steering request signal that triggers steering requested independently of a driver steering request directly or indirectly into the second electronic brake control device, and wherein the brake request signal and/or the steering request signal is generated depending on driving operating conditions.

8. The electrical apparatus of claim 7, wherein at least the following are coupled to the data bus: an electronic controller of the autopilot device and/or an electronic controller of the driver assistance system, the first electronic brake control device, the second electronic brake control device, the electronic steering control device, the evaluation electronics interacting with the sensor device and an engine controller of a drive machine of the vehicle.

9. The electrical apparatus of claim 1, further comprising:
an electromechanical steering device, with or without a continuous mechanical connection between a steering wheel and a steering transmission, and having an electronic steering control device and an electrical steering actuator, and wherein the electronic steering control device receives a steering request signal and actuates the electrical steering actuator independently of the steering request signal so as to steer the vehicle.

10. The electrical apparatus of claim 9, wherein steering control routines are implemented in the second electronic brake control device, which generates the steering request signal depending on a steering request by the autopilot device, the driver assistance system or by the driver operating a steering wheel and then couples it into the electrical steering actuator.

11. The electrical apparatus of claim 9, wherein the electromechanical steering device is supplied with electrical energy by the second electrical energy source or by the second energy supply circuit.

12. The electrical apparatus of claim 1, further comprising:
evaluation electronics interacting with the sensor device to form sensor signals for a data bus from the sensor signals delivered by the sensor device and to couple the sensor signals into a connected data bus to which at least the second electronic brake control device is also connected.

13. The electrical apparatus of claim 1, wherein the electropneumatic service brake device is supplied with electrical energy by the first electrical energy source or by a first energy supply circuit that is independent of the second electrical energy source or the second energy supply circuit that supplies the electropneumatic service brake valve device and the sensor device with electrical energy.

14. The electrical apparatus of claim 1, wherein the means for generating the second actuation force contains at least one electrical, electrohydraulic or electropneumatic actuator that is controlled by electrical signals from the second electronic brake control device.

15. The electrical apparatus of claim 14, wherein the means for generating the second actuation force contains at least one electropneumatic solenoid valve device that couples out at least one pneumatic control pressure depending on the electrical signals coupled out by the second electronic brake control device and on which control pressure the second actuation force depends.

16. The electrical apparatus of claim 15, wherein the at least one control pressure coupled out by the at least one solenoid valve device is measured by a sensor system and regulated by comparison with a setpoint value in the second electronic brake control device, and wherein the sensor system and the solenoid valve device together with the second electronic brake control device form a control pressure regulator for regulating the pneumatic control pressure.

17. The electrical apparatus of claim 16, wherein the pneumatic control pressure is couple-able into at least one control chamber of the electropneumatic service brake valve device that is delimited by the at least one control piston, and wherein the control chamber is arranged such that, when aerated, it brings about a second actuation force, in the same direction as or in the opposite direction to the first actuation force, on the at least one control piston.

18. A vehicle, comprising:
an electrical apparatus of a vehicle, including:
a) a service brake device includes an electropneumatic service brake device, which is an electronically brake pressure-regulated brake system, which contains an electropneumatic service brake valve device, a first electronic brake control device, electropneumatic modulators and pneumatic wheel brake actuators;
b) a sensor device to deliver sensor signals, including at least one of the following sensors: at least one wheel rotational speed sensor that records the wheel rotational speed of at least one vehicle wheel assigned thereto, a longitudinal acceleration sensor that records the longitudinal acceleration of the vehicle, a transverse acceleration sensor that records the transverse acceleration of the vehicle, a yaw rate sensor that records the yaw rate of the vehicle, or a steering wheel angle sensor that records the steering wheel angle of a steering wheel of the vehicle, wherein:
c) the first electronic brake control device is configured to electrically control the electropneumatic modulators and the electropneumatic modulators then generate pneumatic brake pressures or brake control pressures for the pneumatic wheel brake actuators, and
d) the electropneumatic service brake valve device has a service brake actuation member and, within at least one electrical service brake circuit, at least one electrical channel containing at least one electrical brake value transmitter, able to be actuated by the service brake actuation member, for coupling out actuation signals depending on an actuation of the service brake actuation member, and at least one second electronic brake control device, receiving the actuation signals and independent of the first electronic brake control device, which second electronic brake control device couples brake request signals into the first electronic brake control device depending on the actuation signals, and, within at least one pneumatic service brake circuit, at least one pneumatic channel in which at least one control piston of the service brake valve device is loaded with a first actuation force by actuating the service brake actuation member on the basis of a driver brake request, and the control piston directly or indirectly controls at least one double-seat valve, containing an inlet seat and an outlet seat, of the service brake valve device to generate pneumatic brake pressures or brake control pressures for the pneumatic wheel brake actuators;

e) a means, containing the second electronic brake control device of the electropneumatic service brake valve device, to generate a second actuation force, at least in the presence of braking requested independently of a driver brake request, that acts on the at least one control piston in the same direction as or in the opposite direction to the first actuation force;

wherein:
- f) brake slip regulation routines and driving dynamics regulation routines are implemented in the second electronic brake control device,
- g) the second electronic brake control device receives sensor signals from the sensor device, and
- h) in the presence of braking requested depending on driver braking or requested independently of a driver brake request, the means, containing the second electronic brake control device of the electropneumatic service brake valve device, generates the second actuation force, including depending on the sensor signals received by the second electronic brake control device, such that at least one brake slip regulation operation and driving dynamics regulation operation is performed in the requested braking;

wherein the electropneumatic service brake device is supplied with electrical energy by a first energy supply source that is independent of a second energy supply source that supplies the electropneumatic service brake valve device and the sensor device with electrical energy, and wherein the first electronic brake control device is configured to detect a fault in a second electrical energy supply circuit containing the second electrical energy source or in a steering device, and, when it detects such a fault and in the presence of an actuation signal generated by the signal transmitter, to ignore steering request signals potentially coupled out by an autopilot device and not to implement the steering request signals.

* * * * *